(12) United States Patent  (10) Patent No.: US 10,657,776 B2
Law et al.  (45) Date of Patent: May 19, 2020

(54) ALARM HANDLING AND VIEWING SUPPORT IN A PROCESS PLANT

(71) Applicant: FISHER-ROSEMOUNT SYSTEMS, INC., Round Rock, TX (US)

(72) Inventors: Gary K. Law, Georgetown, TX (US); Godfrey R. Sherriff, Austin, TX (US); Brandon Hieb, Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 87 days.

(21) Appl. No.: 15/332,635

(22) Filed: Oct. 24, 2016

(65) Prior Publication Data

US 2018/0114414 A1  Apr. 26, 2018

(51) Int. Cl.
*G08B 5/22* (2006.01)
*G05B 23/02* (2006.01)
*G08B 29/02* (2006.01)

(52) U.S. Cl.
CPC ........... *G08B 5/22* (2013.01); *G05B 23/0272* (2013.01); *G08B 29/02* (2013.01)

(58) Field of Classification Search
CPC ....... G08B 5/22; G08B 29/02; G05B 23/0272
See application file for complete search history.

(56) References Cited

U.S. PATENT DOCUMENTS

| | | | |
|---|---|---|---|
| 5,768,119 | A | 6/1998 | Havekost et al. |
| 6,774,786 | B1 | 8/2004 | Havekost et al. |
| 6,775,707 | B1 | 8/2004 | Bennett et al. |
| 7,030,747 | B2 | 4/2006 | Scott et al. |
| 7,111,070 | B2 | 9/2006 | Bennett et al. |
| 7,113,085 | B2 | 9/2006 | Havekost |
| 7,250,856 | B2 | 7/2007 | Havekost et al. |
| 7,574,531 | B2 | 8/2009 | Bennett et al. |
| 8,000,814 | B2 | 8/2011 | Havekost et al. |
| 8,779,916 | B2 | 7/2014 | Van Camp et al. |
| 2005/0012608 | A1* | 1/2005 | Havekost ........... G05B 23/0272 340/517 |

(Continued)

OTHER PUBLICATIONS

U.S. Appl. No. 14/828,129, filed Aug. 17, 2015.

*Primary Examiner* — Mohamed Barakat
(74) *Attorney, Agent, or Firm* — Marshall, Gerstein & Borun LLP

(57) ABSTRACT

An alarm handling and viewing system includes an alarm display interface that enables the different alarms generated by the same control module, safety system module, device, etc., to be handled and viewed in a manner that is different than each other and/or that is different than the display parameters specified for the module or device that generates the alarms. The system thus enables the selection of various different alarms of a single control module, device, etc., to result in different plant displays, different faceplate displays, and/or different alarm handling parameters to be used to provide further information to the user regarding the selected alarm. This feature, in turn, enables the alarm handling and viewing system to immediately switch to a predetermined plant display, faceplate display, or detail display best suited to the individual alarm being viewed, to thereby enable a control operator to more quickly identify the source or cause of an alarm and/or to determine a cause of action to take in responding to the alarm.

37 Claims, 9 Drawing Sheets

(56) References Cited

U.S. PATENT DOCUMENTS

| | | |
|---|---|---|
| 2008/0255681 A1 | 10/2008 | Scott et al. |
| 2010/0004759 A1 | 1/2010 | Scott et al. |
| 2012/0259436 A1* | 10/2012 | Resurreccion ..... G05B 23/0216 700/17 |
| 2013/0038455 A1* | 2/2013 | Chowdhary .......... G01F 23/284 340/612 |
| 2013/0100136 A1 | 4/2013 | Van Camp et al. |
| 2016/0098018 A1 | 4/2016 | Van Camp |
| 2016/0182274 A1* | 6/2016 | Kiesekamp ........... H04L 41/069 709/224 |
| 2016/0328954 A1 | 11/2016 | Ramadoss et al. |
| 2016/0335731 A1* | 11/2016 | Hall ..................... G06Q 50/163 |

* cited by examiner

ALARM HANDLING AND VIEWING SUPPORT IN A PROCESS PLANT

TECHNICAL FIELD

This patent relates generally to process plants and process control systems, and more particularly, to methods and systems for configuring alarms to provide better alarm handling and viewing support within process plants and process control systems.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via one or more wireless communication links or networks. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature, flow, or pressure, etc., to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. I/O devices, which are also typically located within the plant environment, typically are disposed between a controller and one or more field devices, and enable communications there between, e.g., by converting electrical signals into digital values and vice versa. As utilized herein, field devices, controllers, and I/O devices are generally referred to as "process control devices," and are generally located, disposed, or installed in a field environment of a process control system or plant.

Still further, in many process or industrial plants, the process control network includes a safety instrumented system (SIS) which operates to detect significant safety related problems within the process plant and to automatically close or open valves, remove power from devices, switch flows within the plant, etc., when a problem occurs which might result in or lead to a serious hazard in the plant, such as a spill of toxic chemicals, an explosion, etc. These safety systems typically have one or more separate controllers apart from the standard process control controllers, called safety system logic solvers, which are connected to safety field devices via separate buses, communication lines, or wireless networks installed within the process plant. The logic solvers execute safety instrumented function (SIF) routines that use the safety field devices to detect process conditions associated with significant events, such as the position of certain safety switches or shutdown valves, overflows or underflows in the process, the operation of important power generation or control devices, the operation of fault detection devices, etc., to thereby detect events within the process plant. When an event, which may be a single condition or the simultaneous occurrence of two or more conditions, is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

In both cases, information from the field devices, the controllers, and the safety system logic solvers (also called safety controllers) is usually made available over a data highway or communication network to one or more other hardware devices, such as operator workstations, personal computers or other types of computing devices with user interfaces, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable a control or a safety system operator to perform functions with respect to controlling a process and/or operating the process plant, such as changing settings of the process control routine or a safety routine, modifying the operation of the control modules within the process controllers, the safety system controllers, the field devices, etc., viewing the current state of the process, viewing alarms generated by field devices, the process controllers, or the safety system controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller (such as the process controllers and the safety system controllers) and, in some cases, one or more field devices, stores and executes a respective controller or safety application that runs the control modules assigned and downloaded thereto to implement actual process control and safety system functionality.

Moreover, one or more user interface devices, or plant display applications which may be executed on one or more user interface devices, such as operator workstations, one or more remote computing devices in communicative connection with the operator workstations and the data highway, etc., receive data from the controllers and the field devices via the data highway and display this data to process control system designers, operators, or users via a user interface screen. These user interface devices or applications may provide any of a number of different views, such as an operator's view, an engineer's view, a technician's view, etc. tailored to actions performed by different users in the plant. Moreover, a data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

One of the important activities performed by control and or safety system operators, maintenance system operators, etc., relates to viewing and responding to alarms that are generated by the various devices, control routines, safety system routines, maintenance routines, etc., during operation of the plant. Generally speaking, process control operators, safety system operators, maintenance personnel, etc., view a user interface display screen provided by a user interface application that is executed on a workstation, a handheld device, etc., generally within the back-end environment of the plant away from the actual field devices and other field equipment within a field environment of the plant. During the operation, the user interface application may present one of a number of possible preconfigured plant displays to the user, wherein each plant display typically depicts some area, unit, section, or other part of the plant. As is commonly known, physical process elements (such as valves, sensors, etc., that are to be utilized to control a process in a process plant) may be depicted in accordance with Piping and Instrumentation Diagrams (P&IDs) and/or other plans or "blueprints" of the plant floor layout and/or of the process control system or the safety system layout. Additionally, these user interface applications typically display an alarm banner or other alarm display that indicates some or all of the various alarms that have been generated or initiated by devices and logic modules within the plant, such as device alarms generated by smart devices within the plant, control alarms generated by control routines or modules within the controllers (such as the process and safety system controllers) in the plant, maintenance alarms generated by devices or maintenance applications running the plant, etc. The alarm banner typically depicts an icon associated with each alarm that has been initiated within the plant, and these icons may be organized, color coded, displayed as solid or blinking icons, etc., based on a severity, priority, location, or other criteria, of the alarm or of the source of the alarm.

Generally speaking, the user is able to click on the alarm in the alarm banner and immediately be provided with a preset user interface depiction associated with the alarm that enables a user, such as control system operator, to view the state of the process or equipment related to the alarm. Such a display may be a plant display in the form of, for example, a PI&D diagram, a faceplate display of a device or module, other information about a device or module, etc., that generated the alarm. However, in the typical alarm display system, the alarm identification, description, and alarm viewing and display navigation attributes are, by default, determined by the general properties of the container or the source of the alarm, wherein the container may be a control module, a safety system module, an equipment module, a control system element, a field device, etc. Thus, alarms associated with a control module, for example, are tied to the general alarm handling properties of the control module from which these alarms originated. As such, when an alarm is displayed in an alarm banner on a user interface, clicking on the alarm brings up a plant display and/or a faceplate display associated with the control module that generated the alarm. However, in many cases, the preconfigured display for the control module associated with or in which the alarm was generated may not be the best graphical or other type of information to provide to the user to enable the user to best deal with the particular alarm. This fact is especially true in safety systems, in which the alarms being generated by a particular safety system module may deal with many different devices or other sources in the plant that are not shown well or are that are not shown at all in the plant display associated with the safety module that generated the alarm.

As one example, a module A that runs a process may have a single plant display DA and an associated faceplate display FPA. However, the operation of the module may incorporate or use two sub-modules A1 and A2, each of which may have its own associated plant display (e.g., DA1 and DA2, respectively), and its own associated faceplate display (FPA1 and FPA2, respectively). The plant displays (DA1 and DA2) and the faceplate displays (FPA1 and PFA2) for the sub-modules A1 and A2 may depict different and/or more information than the plant display (DA) and the faceplate display (FPA) for the module A. However, clicking on an alarm in an alarm banner associated with the module A (in which the alarm was generated), regardless of whether the alarm was actually generated by sub-module A1 or A2, would automatically navigate to the plant display DA and to the faceplate display FPA. If the alarm related to a particular transmitter that is within the sub-module A1 but that is not depicted in the module plant display DA or the module faceplate display FPA, the user will not see the source of the alarm in the plan display or the faceplate display which is then presented to the user as a result of the user selecting the alarm. In fact, in this case, a user might prefer that, by clicking on the alarm in the alarm banner, that the user interface system navigate to the plant display DA1 and to the faceplate display FPA1, because that is where the transmitter with relevant information about the alarm is depicted. In this case, the user must now manually navigate to the more desirable displays, which takes time and skill.

Presently, if a user wants to circumvent this issue, the user creates a separate "shadow" alarm display module that mirrors the control module, but with a separate alarm (which is in fact, a duplicate alarm of the control module) or a subset of alarms (again all of which are duplicate alarms of the control module) which mirror the alarms within the actual control module, and then clicks the alarm generated by the "shadow" alarm display module to cause the user interface display to navigate to the desired plant display and faceplate display of the "shadow" alarm display module, for example, to the plant display DA1 and to the faceplate display FPA1. This work-around requires additional memory, additional loading on the processor and thus additional processor execution cycles, etc., and requires additional programming, all of which are inefficient within the computer operation. This work-around also results in duplicate alarms being generated by two, basically redundant modules, and requires the user to know which alarm to use to navigate to the desired display.

SUMMARY

An alarm handling and viewing system includes an alarm display interface that enables alarms generated by a container (e.g., a control module, a safety system module, a device, etc.) to be handled and viewed in a manner that is different than each other and that is different from general display parameters specified for the container. As an example, when a user selects an alarm (that is generated by a particular container) on the alarm display interface, the alarm display interface automatically provides different plant displays, provides different faceplate displays, and/or uses different alarm handling parameters for the alarm than the plant display, faceplate display, and/or handling parameters of the container itself and/or of other alarms of the container.

To implement this functionality, the alarm handling and viewing system may assign a unique identifier (e.g., a tag or name), description, and display navigation attributes to each of a set of alarm groups, each alarm group having a single alarm or multiple alarms associated with one or more containers a process plant, without these identifiers, descriptions, and display navigation attributes being tied to the display navigation attributes of the container itself. As a result, the disclosed alarm handling and viewing system is able to immediately switch to a predetermined plant display, faceplate display, or detail display best suited to the individual alarm being selected for viewing to enable a control operator, for example, to more quickly identify the source or cause of an alarm and/or to determine a cause of action in dealing with the alarm. The alarm handling and viewing system thus makes it easier for plant personnel to navigate to the appropriate plant display upon the occurrence of an alarm while, at the same time, reducing the required computing resources and decreasing the programming burden on the alarm display system, thus making it easier to configure alarm displays that react to inputs in the manner that personnel would naturally expect. This system also reduces computer loading inefficiencies and higher CPU and memory consumption of control system resources over the prior art techniques described above.

In one case, the alarm handling and viewing system configures one or more containers, such as one or more control modules, safety logic modules, devices, or other entities that generate alarms, to include a set of alarm groups. The alarm handling and viewing system then enables a user to separately assign a set of alarm handling and viewing properties to each alarm group, with the alarm handling and viewing properties including, for example, a plant display to use for the alarms in the alarm group, a faceplate display to use for the alarms in the alarm group, alarm handling parameters (such a priority, suppression characteristics, display characteristics, etc.) to use for each of the alarms in the alarm group, etc. Thereafter, the alarm handling and viewing system enables a user to configure which alarms of a container are to be assigned to each alarm group or if particular alarms of the container should not be assigned to any alarm group. In one case, the containers are then instantiated or created with these alarm groups and alarm group handling and viewing parameters disposed therein. During operation of the plant, when an alarm is initiated by the container, the alarm handling and viewing system displays an indication or icon for the alarm on an alarm display interface, such as an alarm banner, and enables the user to select the alarm for viewing. When an alarm that has been assigned to an alarm group of a particular container is selected, the alarm handling and viewing system determines, from a module list, the correct communication path to the container having the alarm group information stored therein, and then uses this communication path to obtain the alarm handling and viewing properties for the alarm group. The alarm handling and viewing system then uses these properties to, for example, provide one or more displays, such as a plant display, a faceplate display, etc., to the user via a user interface device to enable the user to deal with the alarm. Moreover, the alarm handling and viewing system may also use the stored alarm handling parameters (such a priority, suppression characteristics, etc.) as stored for the alarm group to drive the manner in which the alarm is shown, viewed, suppressed, etc. via the user interface device.

DETAILED DESCRIPTION

Figure 1:
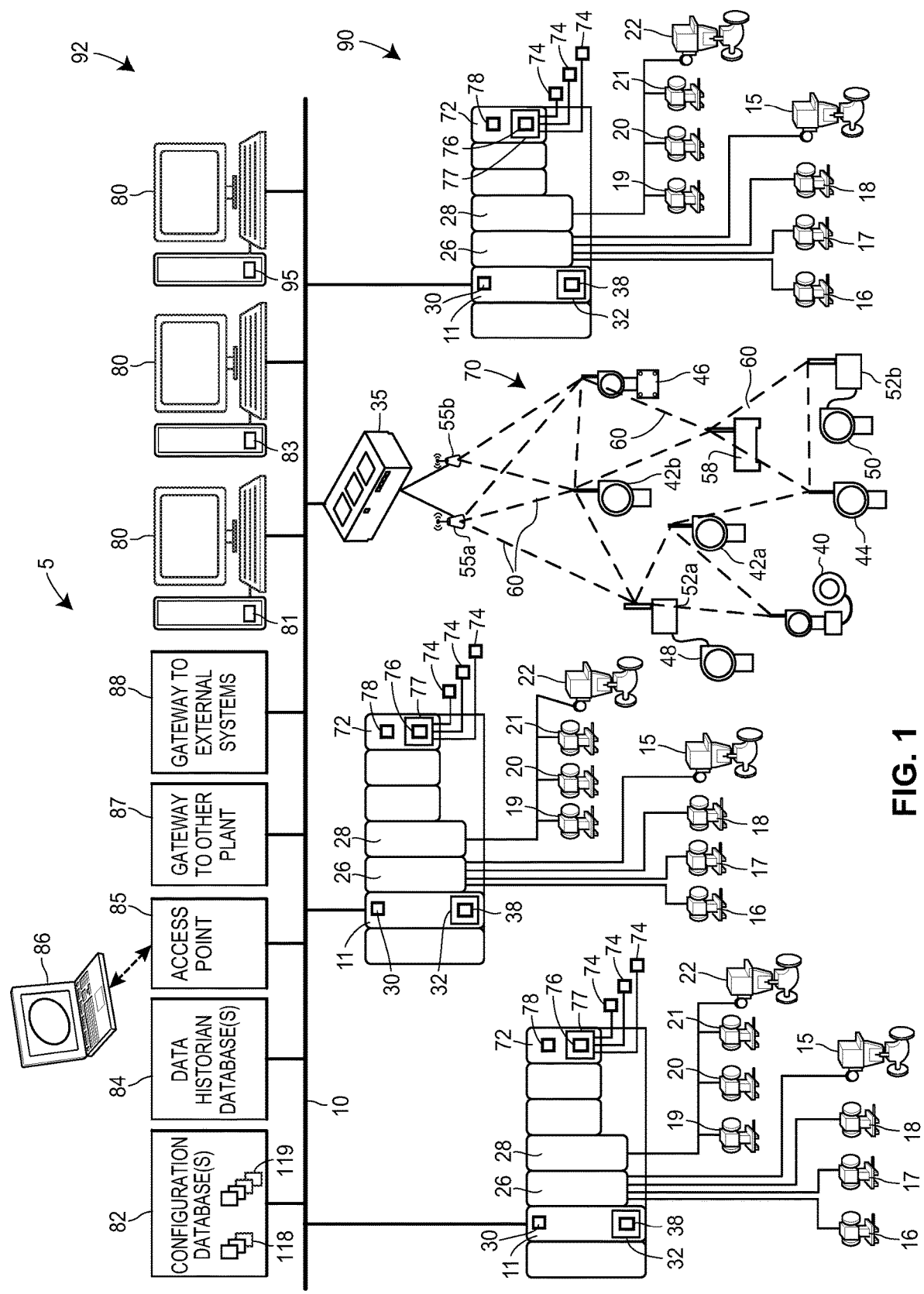
FIG. 1 depicts a block diagram illustrating an example process plant having an alarm display user interface device in which an efficient and flexible alarm handling and viewing system may be provided.

FIG. 1 illustrates a process plant, process control system, or process control environment 5 that may operate to control one or more industrial processes in real-time and in which an alarm handling and viewing system may be implemented to provide enhanced alarm handling and viewing capabilities within the control system or plant 5. Generally speaking, the process plant 5, when commissioned and operating on-line, includes one or more wired or wireless process control devices, components, or elements that perform physical functions in concert with a process control system that controls one or more processes executing within the process plant (which may be any type of process or industrial plant). The process plant 5 and/or process control system may include, for example, one or more wired communication networks and/one or more wireless communication networks. Additionally, the process plant 5 or control system may include centralized databases, such as continuous, batch, asset management, configuration, historian, and other types of databases.

In particular, FIG. 1 depicts is a block diagram of an example process plant, process control system, or process control environment 5 having one or more process controllers and safety controllers that receive signals indicative of process measurements made by field devices, that process this information using one or more process control and/or safety system control routines which generate control signals that are sent over wired or wireless process control communication links or networks to other field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate with controllers using input/output (I/O) devices. Process controllers, field devices, and I/O devices may be wired or wireless, and any number and combination of wired and wireless process controllers, field devices and I/O devices may be included in the process plant environment or system 5.

For example, the system of FIG. 1 depicts a control system having multiple process controllers 11, in which some of the process controllers 11 are communicatively connected to field devices 15-22 via input/output (I/O) cards 26 and 28 in a wired manner. Moreover, some of the process controllers 11 are communicatively connected in a wireless manner or partially wireless manner to field devices 40-46 via a wireless gateway 35 and a process control data highway 10. The process control data highway 10 may include one or more wired and/or wireless communication links, and may be implemented using any desired or suitable or communication protocol such as, for example, an Ethernet protocol. In some configurations (not shown), one or more of the process controllers 11 may be communicatively connected to the wireless gateway 35 using one or more communications networks other than the data highway or communication network 10, such as by using any number of other wired or wireless communication links that support any other communication protocols, e.g., Wi-Fi or other IEEE 802.11 compliant wireless local area network protocols, mobile communication protocols (e.g., WiMAX, LTE, or other ITU-R compatible protocol), the Bluetooth® protocol, the HART® protocol, the WirelessHART® protocol, the Profibus protocol, the FOUNDATION® Fieldbus protocol, etc.

The controllers 11, which may be, by way of example, DeltaV™ controllers sold by Emerson Process Management, may operate to implement a batch process or a continuous process using at least some of the field devices 15-22 and 40-46. In addition to being communicatively connected to the process control data highway 10, the controllers 11 may be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controllers 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controllers 11 of FIG. 1 each define a separate node of the process control system and include a processor 30 that implements or oversees one or more process control routines 38 (e.g., that are stored in a memory 32), with such process control routines 38 generally being referred to herein as control modules. The processor 30 is configured to communicate with the field devices 15-22 and 40-46 and with other nodes communicatively connected to the controllers 11. It should be noted that any control routines or modules 38 described herein may have parts thereof implemented or executed by different controllers or other devices if so desired. Likewise, the control routines or control modules 38 described herein which are to be implemented within the process control system 5 may take any form, including software, firmware, hardware, etc. Additionally, the control routines 38 may be implemented in any desired software format, such as using object oriented programming, ladder logic, sequential function charts, function block diagrams, or using any other software programming language or design paradigm. The control routines or control modules 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controllers 11 may be configured to implement a control strategy or control routine in any desired manner.

In one case, the controllers 11 implement a control strategy using control modules 38 defined by what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controllers 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. Thus, as will be understood, the controllers 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/Ocards 26, while the field devices 19-22 are smart devices, such as FOUNDATION® Fieldbus field devices, that communicate over a digital bus to the I/O cards 28 using a FOUNDATION® Fieldbus communications protocol. In some embodiments, though, at least some of the wired field devices 15-22 and/or at least some of the I/O cards 26, 28 additionally or alternatively may communicate with the controllers 11 using the process control data highway 10 and/or by using other suitable control system protocols (e.g., Profibus, DeviceNet, Foundation Fieldbus, ControlNet, Modbus, HART, etc.).

In the system of FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, taking measurements of process parameters, etc. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 is depicted as a legacy 4-20 mA device and a field device 50 is depicted as a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In the example system of FIG. 1, the wireless devices 40-46 and 52-58 communicate with each other and with the wireless gateway 35 over wireless links 60 of the wireless communications network 70, and/or via the process control data highway 10.

Still further, one or more of the process controllers 11 may be connected to safety logic solvers or safety system controllers 72, which, in turn, are connected to safety system field devices or assets 74. The safety controllers 72 may be connected directly to the field devices 74 (as shown in FIG. 1) or may be connected to the field devices 74 via one or more I/O devices (not shown in FIG. 1) and, in any event, may be connected to the field devices 74 via any wired or wireless communication links. Likewise, the field devices 74 may be any types of devices that perform any type of physical function or sensing function within the plant for safety purposes, and may conform to any of the communication protocols described above or other communication protocols. Likewise, the safety controllers 72 may store one or more safety system logic modules 76, referred to herein as safety system modules, in a memory 77, and may execute these safety system modules 76 on a processor 78. The safety system logic modules 76 may be configured in any of the manners described above for the process control modules 38 and may perform any desired functions within the safety system, including user interface functions such as alarming functions. If desired, the safety logic controllers 72 may be in the same or different nodes as the process controllers 11.

The process plant or the process control system 5 of FIG. 1 also includes one or more operator workstations 80, each of which is communicatively connected to the data highway 10, and each of which includes a memory and one or more computer processors. Operators and other personnel may use the operator workstations 80 to configure the plant 5 and elements within the plant 5 and/or to view and monitor run-time operations of the process plant 5, as well as take any diagnostic, corrective, maintenance, and/or other actions that may be required. At least some of the operator workstations 80 may be located in various, protected areas in or near the plant 5, and in some situations, at least some of the operator workstations 80 may be remotely located, but nonetheless in communicative connection with the plant 5. The operator workstations 80 may be wired or wireless computing devices.

The example process control system 5 is further illustrated as including a configuration application 81 (stored in a memory of and executed on a processor of at least one of the operator workstations 80) and a configuration database 82, each of which is also communicatively connected to the data highway 10. As discussed above, various instances of the configuration application 81 may execute on one or more computing devices to enable users to create or change process control modules (38) and/or safety system modules (76), to configure alarm handling and viewing routines and support mechanisms, and to download these modules and support mechanisms via the data highway 10 to the controllers 11, the safety logic devices 72, or other nodes of the process plant 5, as well as enable users to create or change operator interface display modules executed on operator interface devices via which an operator is able to view the process plant 5, view data, and change data settings within the process control routines 38, the safety system routines 76, the field devices 15-22 and 40-58 of the plant 5, etc. The configuration database 82 stores the created (e.g., configured) control and safety system modules and/or operator interface display modules or routines. If desired, the configuration application 81 and the configuration database 82 may be centralized and have a unitary logical appearance to the process control system 5, although multiple instances of the configuration application 81 may execute simultaneously within the process control system 5, and the configuration database 82 may be implemented across multiple physical data storage devices. If desired, the user interface display devices for the configuration system may be different than the operator workstations 80, as the user interface device for the configuration system are utilized by configuration and development engineers irrespective of whether or not the plant 5 is operating in real-time, whereas the operator workstations 80 are generally utilized by control and safety system operators during real-time operations of the process plant 5 (also referred to interchangeably herein as "run-time" operations of the process plant 5).

The example process control system 5 also include a data historian application 83 and a data historian database 84, each of which is also communicatively connected to the data highway 10. The data historian application 83 operates to collect some or all of the data provided across the data highway 10, and to historize or store the data in the historian database 84 for long term storage. Similar to the configuration application 81 and the configuration database 82, the data historian application 83 and the historian database 84 may be centralized and have a unitary logical appearance to the process control system 5, although multiple instances of a data historian application 83 may execute simultaneously within the process control system 5, and the data historian database 84 may be implemented across multiple physical data storage devices.

In some configurations, the process control system 5 includes one or more other wireless access points 85 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 85 allow handheld or other portable computing devices (e.g., user interface devices 86) to communicate over a respective wireless process control communication network that may be different from the wireless network 70 and that may support a different wireless protocol than the wireless network 70. For example, the wireless or portable user interface device 86 may be a mobile workstation or diagnostic test equipment that is utilized by an operator or by maintenance personnel within the process plant 5 (e.g., an instance of one of the operator workstations 80). In some scenarios, in addition to portable computing devices, one or more process control devices (e.g., the controllers 11, the field devices 15-22, or wireless devices 40-58) also communicate using the wireless protocol supported by the access points 85.

In some configurations, the process control system 5 includes one or more gateways 87, 88 to systems that are external to the immediate process control system 5. Typically, such systems may be provided for consumers or suppliers of information generated by or operated on by the process control system 5. For example, the process control plant 5 may include a gateway node 87 to communicatively connect the immediate process plant 5 with another process plant. Additionally or alternatively, the process control plant 5 may include a gateway node 88 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates three controllers 11 with a finite number of field devices 15-22 and 40-46, wireless gateways 35, wireless adaptors 52, access points 55, routers 58, wireless process control communications networks 70, safety system logic devices 72, and safety system field devices 74 included in the example process plant 5, this example is only an illustrative and non-limiting embodiment. Any number of controllers 11 and/or safety logic devices 72 may be included in the process control plant or system 5, and any of the controllers 11 and safety logic devices 72 may communicate with any number of wired or wireless devices and networks 15-22, 40-46, 35, 52, 55, 58, 70, and 74 to control a process in the plant 5.

Further, it is noted that the process plant or control system 5 of FIG. 1 includes a field environment 90 (e.g., the process plant floor) and a back-end environment 92 which are communicatively connected by the data highway 10. As depicted in FIG. 1, the field environment 90 includes physical components (e.g., process control devices, field devices, I/O networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58, 70 and the safety logic solvers 72 and safety devices 74 are located, disposed, or otherwise included in the field environment 90 of the process plant 5. Generally speaking, in the field environment 90 of the process plant 5, raw materials are received and processed using the physical components disposed therein to generate one or more products.

The back-end environment 92 of the process plant 5 includes various components such as computing devices, operator workstations, databases or databanks, etc., that are typically shielded and/or protected from the harsh conditions and materials of the field environment 90. Referring to FIG. 1, the back-end environment 92 includes, for example, the operator workstations 80, the configuration or development systems 81, 82 for control modules and other executable modules, the data historian systems 83, 84, and/or other centralized administrative systems, computing devices, and/or functionality that support the run-time operations of the process plant 5. In some configurations, various computing devices, databases, and other components and equipment included in the back-end environment 92 of the process plant 5 may be physically located at different physical locations, some of which may be local to the process plant 5, and some of which may be remote.

Figure 2:
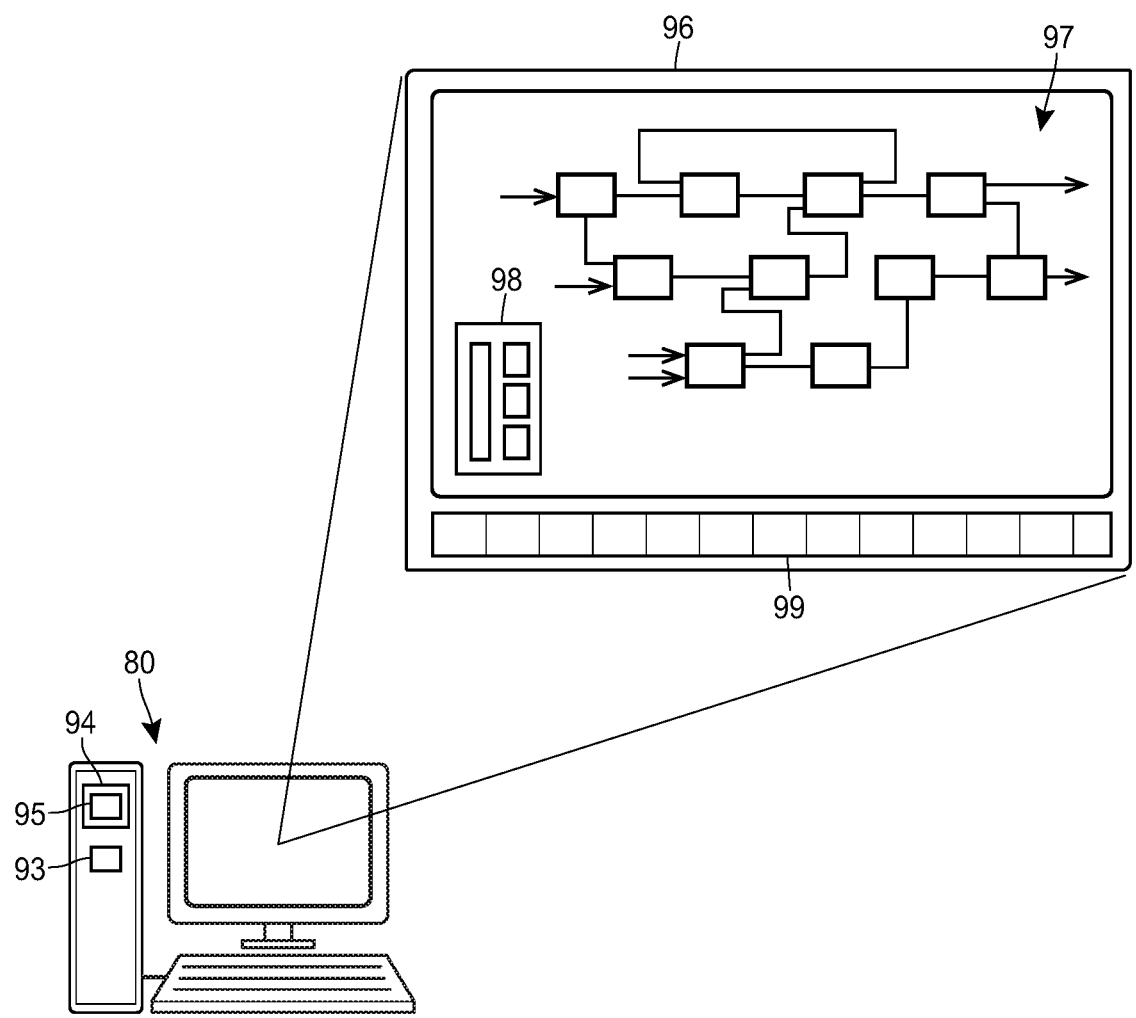
FIG. 2 depicts a plant or alarm display application executed on an operator workstation that presents a user display interface illustrating a plant display, a faceplate display, and an alarm banner display, and that enables a user to view various parts or sections of the plant or faceplates of entities within the plant based on a user selection of one of the alarms in the alarm banner display.

Importantly, during operation of the plant 5, as illustrated in FIG. 1 one or more of the operator workstations 80 may implement a user interface application 95 that provides a user, such as a control system operator, with a view of various equipment and data associated with the equipment. FIG. 2 illustrates one of the operator interfaces 80 of FIG. 1 as including a computer processor 93 and a memory 94 which stores a user interface display program or application 95 that executes on the processor 93 to provide a user with one or more plant display views and/or faceplate display views to assist the user in performing day-to-day operations, such as managing the plant, viewing the current state of equipment in the plant, etc. One such plant display view 96 is illustrated in FIG. 2 and presents a user with a view of the plant operation in the form a plant layout view or plant display 97. The plant display 97 may be based on a PI&D diagram and may depict various icons or other representations of devices such as valves, tanks, transmitters (e.g., sensors) as interconnected within the plant 5, and may depict various important parameters and values such as device tags or names, control system references or logic, measured process parameter values, etc. The plant displays 97 may include user interaction features or elements that allow a user to interact with the graphical elements of the display 97 to view additional information, to navigate to other plant displays 97, to view other informational views (such as pop-up windows) regarding elements or parameters in the graphical display, etc. The plant display view 96 may also or instead include one or more faceplate displays 98 for various devices (such as controllers, I/O devices, field devices, etc.), modules (such as control or safety system modules) or other containers within the plant 5. Faceplate displays generally provide some information about a device and/or a module, such as a standard icon for the device or module, a tag, a name, a description, a manufacturer, a device type, one or more values for significant parameters associated with the device or module, etc. Additionally, as is typical, the user interface display application 95 may present an alarm banner 99 or other alarm display that displays icons of the various alarms that have been initiated (that are active) within the plant 5 or portions of the plant 5.

During operation of the plant display application or program 95, the user may use the display view 96 to view various different plant displays (as generated by and associated with different plant display modules or interface modules stored in the configuration database 82 of FIG. 1 for example), wherein each of the plant displays has graphical information that depicts various different equipment, sections, control routines, etc. of the plant 5. The user may manipulate the display view 96 in standard manners to view detailed graphical displays of the same or different sections or parts of the plant 5, to view control system displays (illustrating control logic, for example), etc. The user may also select various elements in the display view 96 to view one or more faceplate displays 98 that provide additional information about those elements. In some cases, the faceplate displays 98 may enable the user to change the values of one or more significant parameters of the element. Likewise, the user may select an alarm icon for one of the alarms in the alarm banner 99 and the plant display application 95 will automatically provide a prefigured plant display associated with that alarm. Generally speaking, the plant display application 95 will, upon the selection of an alarm, communicate with the container (e.g., a device or module) that generated the alarm to obtain information regarding the plant display, faceplate display, and other information to use or to present to the user in the display view 96 for the selected alarm. Generally speaking, a container may be a physical device, such as a field device, an I/O device, etc., or a logical module executed on a processor, such as a process control module, a safety system logic module, etc., or any other entity that generates an alarm.

Importantly, in the past, the application 95 obtained, from the alarm container, the preconfigured plant display and/or the preconfigured faceplate display for the container, and then automatically displayed the referenced plant display and/or faceplate in the display view 96. However, as noted above, this functionality means that the selection of any alarm of a particular container automatically results in the plant display or faceplate display for that container being presented to the operator or other user that selected the alarm in the alarm banner 99. In many cases, however, the default plant display (or faceplate display) for the container of an alarm may not be the best or most suitable plant display (or faceplate display) for dealing with the alarm, as the default plant display and/or faceplate display of the container may not depict the section of the plant most suited to assist a user in understanding the alarm and/or may not depict a plant display and/or a faceplate display that has various details of the plant most useful in understanding and responding to the alarm. Moreover, this functionality does not enable plant displays to be tailored to particular alarms or groups of alarms, as the plant display for any particular alarm is automatically tied to the default plant display of the container which generated the alarm. In the past, to overcome this limitation, plant configuration engineers or operators had to create redundant alarm containers for the sole purpose of being able to assign a tag, a description, and display navigation elements to certain alarms within the alarm container. This work-around resulted in redundant alarms and alarm containers being generated, maintained, and processed, with redundant alarms being presented to the control operator to enable the control operator to navigate to the desired display directly when selecting an alarm in the alarm banner.

The alarm handling and viewing system described herein, on the other hand, separates general control module or other container execution activities from the alarm display management and processing activities for the alarms of the container, to thereby enable the alarms of a single container to be processed and handled differently (i.e., using different plant displays, faceplate displays, alarm handling parameters, etc.) than those specified for the container that generates the alarms. Generally speaking, the alarm handling and viewing system described herein creates any number of alarm groups for each container (e.g., control module, safety system logic solver, device, etc.) that generates one or more alarms, and allows a configuration engineer to associate the different alarms of a particular container with different ones of the alarm groups. Each different alarm group can have separate plant displays, faceplate displays, and alarm handling features associated therewith, which parameters may be used to direct how the user interface application 95 reacts when a particular alarm in the alarm banner 99 is selected.

More particularly, the system described herein enables a configuration person to create alarm groups in a module or device, and to assign any equipment on or components of the module or device to any of the alarm groups. The system then enables the configuration personnel to create and specify the plant displays, the faceplate displays, and the alarm handling parameters to associate with each of the alarm groups. In this manner, a particular module or other container can have a first subset of alarms assigned to a first alarm group having one set of alarm handling properties, and a second subset of alarms assigned to a second alarm group having a different set of alarm handling properties, e.g., different plant displays and/or faceplate displays and/or alarm handling parameter values.

If desired, each alarm group created in or for a particular container may be set up or created as a sub-component of the container or may be created as a separate entity, such as a separate module. In either case, the alarm group may have a unique tag, a description, a primary plant display, a detail plant display, a faceplate display, and/or other alarm handling parameter values associated therewith or defined therefor, which information may be different than the corresponding information stored for the container itself. The unique tag of an alarm group may have the same restrictions as control module tags and this tag will be unique at the system level as is the case for control module tags. However a block or composite within or associated with an alarm group may have the same name as a block or composite within the container which generates the alarm. When the configuration engineer or other user creates the logic for plant control or safety system functions, this person will be able to assign particular portions of the control routines, such as particular control blocks, to one of the created alarm groups, and then any alarms on (in) those control blocks will be within the assigned alarm group. If a composite control block (e.g., a block made up of a set of sub-blocks) is assigned to an alarm group, then all of the control blocks within that composite block (and all of the alarms within the composite block) will automatically be assigned to the alarm group.

Figure 3:
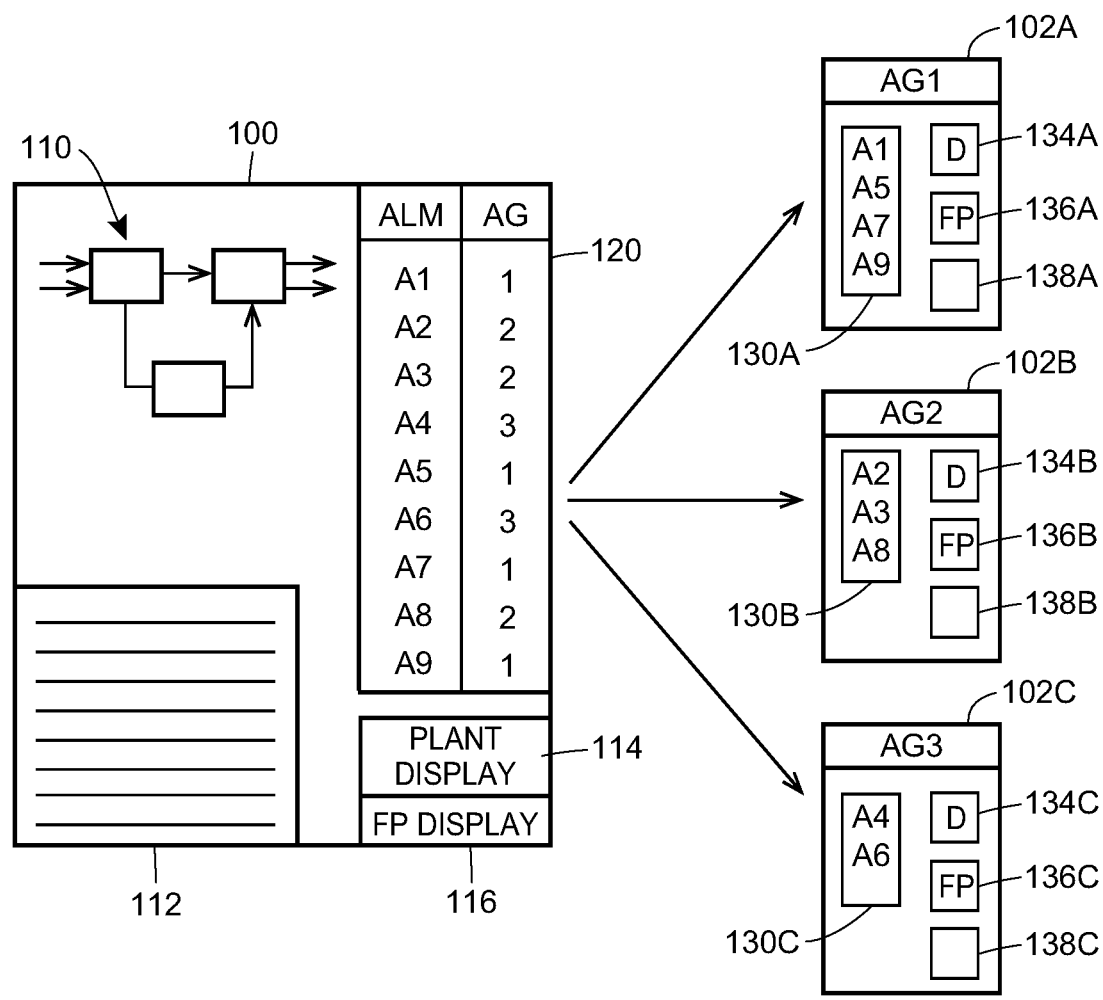
FIG. 3 depicts a control module that includes an alarm group element for each of a set of alarm groups into which various of the different alarms of the control module are placed, with each alarm group element including or referencing a different plant display, a faceplate display, and a set of alarm handling parameter values.

As an example, FIG. 3 illustrates a module 100, which may be, for example, a control module, an SIF module, a device module, etc., in association with three alarm groups AG1, AG2, and AG3 indicated by alarm group elements labeled with reference numbers 102A, 102B, and 102C, respectively. As is typical, the control module 100 includes various components and information therein including, for example, various control module blocks 110, which might be, for example, function blocks that are connected together via communication links. The function blocks 110 generally contain logic that implements calculation and communication operations associated with desired control functions to be executed in the plant when, for example, the control module 100 is instantiated, downloaded to, and executed within a process controller 11 (FIG. 1). Additionally, the control module 100 may include configuration information 112, which may include various different types of configuration data pertaining to the module 100, such as operating parameter values, set points, ranges, limits, a tag name or identifier, etc. As is typical, the control module 100 includes a reference to a primary plant display 114 as well as a reference to a primary faceplate display 116. Of course, the references to the primary plant display 114 and the primary faceplate display 116 for the control module 110 may be references to (pointers for or identifiers associated with) plant displays 118 and faceplate displays 119 illustrated as being stored in the configuration database 82 of FIG. 1, but which could be stored in any of the workstations 80, and/or other servers, user interface devices 80, etc., in the plant 5 and particularly in the back-end environment 92 of the plant 5. These plant displays 118 and faceplate displays 119 are accessible by the user interface application 95 and are used by the application 95 to graphically provide information about the module 100, or a portion of the plant 5 associated with the module 100 to a user on a human machine interface (HMI), e.g., a user interface device.

As illustrated in FIG. 3, the module 100 also includes a set of alarms, indicted with an alarm list 120 which identifies each of the alarms that is associated with or that is generated by the module 100 and, in particular, by one or more of the function blocks 110 of the module 100. The example alarm list 120 of FIG. 3 includes a first column including a set of nine alarms, labeled A1-A9, that are generated by the module 100 and, in particular, by various different ones of the function blocks 110 of the module 100 during execution of the module 100 by, for example, a process controller, a safety system logic solver, etc. Moreover, the alarm list 120 includes a second column that identifies the alarm group to which each of the alarms A1-A9 belongs. In this case, there are three potential alarm groups, labeled AG1, AG2, and AG3, and each of the alarms A1-A9 belongs to one of these alarm groups (although it is possible that some of the alarms A1-A9 could be unassigned to any of the alarm groups AG1-AG3).

Still further, FIG. 3 illustrates the three alarm group elements 102A, 102B, and 102C, which may be stored as sub-components of the module 100 or as separate modules (containers) in, for example, the same device as the control module 100 when implemented or executed within the plant 5. Of course, information pertaining to the alarm group elements 102 may also or instead be stored in, for example, the configuration database 82 or other processing device in the back-end environment 92 of the plant 5. Each of the alarm group elements 102A, 102B, 102C is defined for and is associated with one of the alarm groups AG1, AG2, or AG3 of the control module 100 and, in particular, the alarm group element 102A is associated with the alarm group AG1, the alarm group element 102B is associated with the alarm group AG2, and the alarm group element 102C is associated with the alarm group AG3.

Moreover, as illustrated in FIG. 3, each of the alarm group elements 102 (i.e., 102A, 102B, 102C) includes alarm handling information including a listing of the alarms 130 defining the alarms associated therewith, a reference to a primary plant display 134, a reference to a primary faceplate display 136, and various alarm handling and viewing parameter values 138, which may include, for example, alarm priority characteristics, alarm suppression characteristics, alarm display characteristics such as fonts, sizes, colors, icons, etc., that will be applied to or used for each of the alarms within the alarm group when viewing or interacting with the alarm. It will be understood that the alarm group elements 102 could include additional alarm handling information, such as secondary plant and faceplate display references and values for other alarm handling parameter. Moreover, while the plant display reference 134 and faceplate display reference 136 are described as references to plant displays and faceplate displays stored elsewhere in the plant 5 (such as the displays 118, 119 stored in the configuration database 82 of FIG. 1), these references could include the actual plant displays and faceplate displays themselves, although this configuration may lead to increased communication loads on the system when the user interface application 95 needs to access these plant displays and/or faceplate displays.

In any event, as will be seen in FIG. 3, the alarm group element 102A has an alarm listing 130A of A1, A5, A7, and A9, as well as a plant display reference 134A, a faceplate display reference 136A, and alarm handling and viewing parameter values 138A associated therewith. As will be understood, the plant display reference 134A may reference a different plant display (118) than the plant display reference 114 of the module 100. In a similar manner, the faceplate display reference 136A may reference a different faceplate display (119) than the faceplate display reference 116 of the control module 100. Likewise, as illustrated in FIG. 3, the alarm group element 102B (associated with the alarm group A2) includes an alarm listing 130B including alarms A2, A3, and A8 of the control module 100, a primary plant display reference 134B, a primary faceplate display reference 136B, and a set of alarm handling and viewing parameter values 136B. Additionally, the alarm group element 102C (associated with the alarm group A3) includes an alarm listing 130C including alarms A4 and A6 of the control module 100, a primary plant display reference 134C, a primary faceplate display reference 136C, and a set of alarm handling and viewing parameter values 136C. Again, the primary plant display references 134B and 134C can be different than each other and different than the plant display references 134A and 114, or could in some cases be the same as one or more of these plant display references. In a similar manner, the primary faceplate display references 136B and 136C can be different than each other and different than the faceplate display references 136A and/or 116, or could in some cases be the same as one or more of these references.

While the alarm group elements 102 of FIG. 3 include alarms from a single control module, the alarm group elements 102, if implemented as a separate module or entity within the plant 5, could include alarms from multiple different control modules or other containers. In this case, the alarm listing 130A of the alarm group element 102A (referred to as an alarm group module in this configuration) may include the alarms A1, A5, A7, and A9 of the control module 100 (as defined by the control module alarm list 120) stored as aliased names of the control module 100 from which they originate. Thus, for example, if the control module 100 was named or had a tag CTL101, the alarm A1 from the control module 100 could be stored in the listing 130A as having a name or a tag CTL101/A1. In this manner, the alarm listing 130A may store or include references to other alarms from other control modules (e.g., control modules CTL102, CTL103, etc.) also having the same alarm name (A1). Thus, the set of alarms within the alarm listing 130 of any of the alarm group modules 102 may, in this case, include alarms from one or from more than one control modules or other containers.

As will be understood, the purpose of the alarm group elements 102 is to store a list of alarms 130, as well as to store alarm handling information including a plant display reference 134, a faceplate display reference 136, and potentially other alarm handling information such as alarm handling parameters 138 that are to be used for viewing and/or handling each of the alarms in the alarm list of the alarm group element. It will be understood that the alarm viewing and handling information stored in the alarm group elements 102 is not tied to or based on the plant display, faceplate display, and other handling information in the container (e.g., control module 100) which generates the alarms in the alarm listing 130 of an alarm group element 102, thereby separating alarm handling for alarms in a container from the general display handling and viewing characteristics defined for the container itself. This feature thus enables an alarm handling and viewing application implemented by the user interface application 95 to present plant displays, faceplate displays, and other alarm viewing characteristics that are tailored to particular alarms regardless of the viewing and handling characteristics of the container in which the alarms are generated, thus making the alarm handling characteristics of an alarm display application more useful and easier to understand. Moreover, this system enables alarm handling for an alarm to be separated from the displays defined for the container that generates the alarm without needing to create duplicate alarms, redundant control modules, etc.

While the control module 100 is illustrated in FIG. 3 as including nine alarms associated with three different alarm groups, any number of different alarm groups can be defined for or associated with a control module or other container, and any number of different alarms of the container can be assigned to these different alarm groups. Likewise, in some cases, the alarm list of a control module (e.g., the control module 100 of FIG. 3) or any other container may include alarms that do not reference any alarm groups defined for that control module or container. In this case, the plant display and faceplate display associated with that alarm would be the plant display (e.g., the plant display 114) and the faceplate display (e.g., the faceplate display 116) of the module or container (e.g., the control module 100) holding the alarm, as would normally be the case.

Still further, while FIG. 3 illustrates a single control module 100 having alarms falling within one of three alarm groups (and thus having alarms with handling characteristics defined by three different alarm group elements 102), it is possible that the same set of alarm group elements 102 could be shared amongst a number of different control modules or other containers. That is, further or additional control modules (not shown in FIG. 3) may have alarms that reference the same alarm group elements 102A, 102B and 102C of FIG. 3. These other control modules could also potentially reference different alarm group elements not depicted in FIG. 3. Thus, different control modules (or other containers such as safety system logic modules, devices, etc.) could reference the same alarm group defined by a single alarm group element 102. In this case, as indicated above, the alarm listing 130 of the alarm group element 102 could include references to alarms from different control modules. In one example, multiple different control modules (which may be executed in the same or different nodes of the plant 5) could reference the same set of alarm groups in order enable the different control modules (or more particularly to enable alarms from the different control modules) to use the same set of alarm handling and viewing properties (e.g., to use the same plant display and faceplate display) when any of these control modules generate an alarm.

Figure 4:
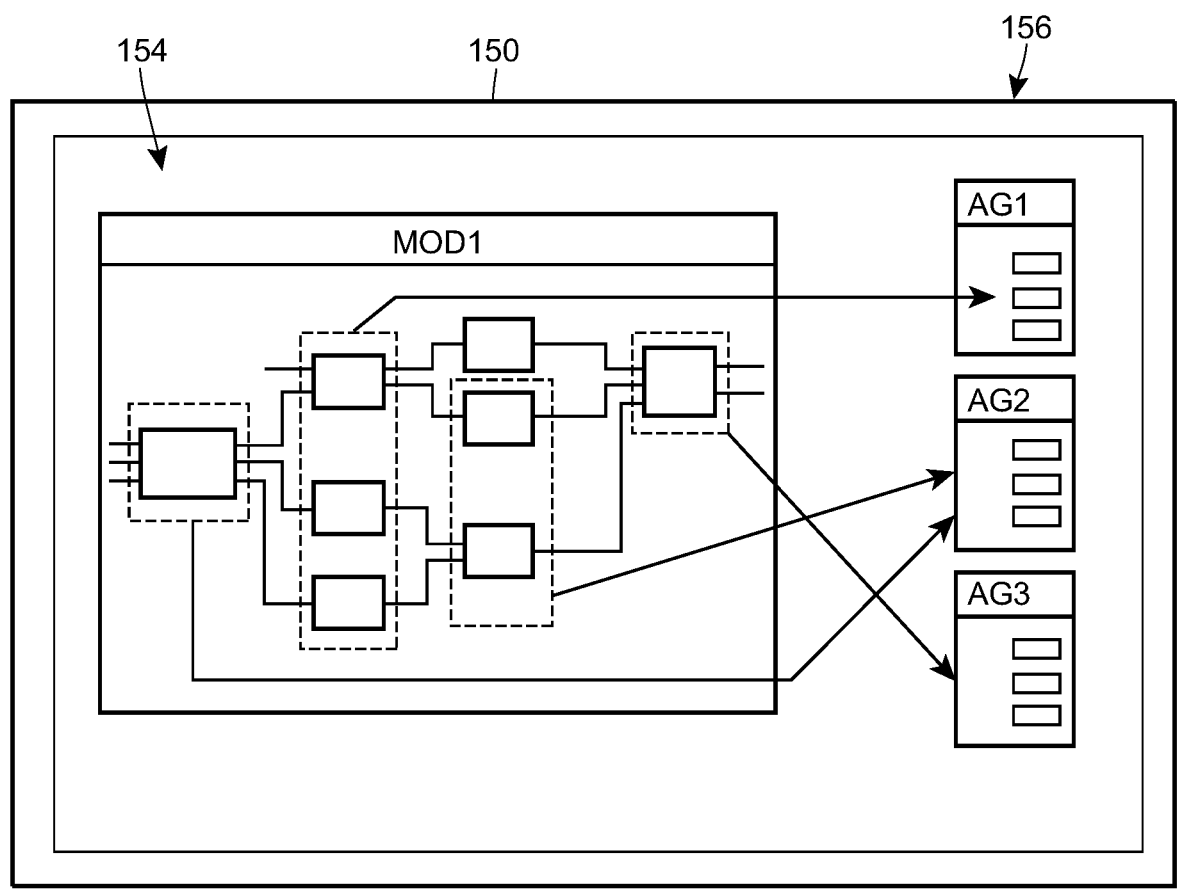
FIG. 4 depicts a configuration system which may be used to configure the various alarms of a control module to be associated with different alarm groups established for the control module.

Referring now to FIG. 4, a configuration system, which may be implemented by one of the configuration applications 81 of FIG. 1 on one of the user workstations 80 of FIG. 1, may provide a user with an alarm configuration screen 150 that enables a user (such as a configuration engineer) to create various different alarm groups for one or more containers (e.g., control modules, devices, etc.), and to assign different alarms of the one or more containers to one of the various alarm groups. In one case, the configuration screen 150 of FIG. 4 may be used to enable a configuration engineer to configure a set of alarm group elements, each of which has a different set of alarm viewing and handling parameters, such as a different or separate plant display and/or a different or separate faceplate display and/or a different or separate set of alarm handling parameters and/or values.

For example, in FIG. 4, the configuration application may display a control module 154, illustrate on the left-hand side of the configuration screen 150, and may display a set of alarm group elements associated with or defined for the control module 154, illustrated on the right-hand side of the configuration screen 150. The configuration application may use the screen 150 to enable the user to import one of various different control modules that already have been created and configured and stored, for example, in the configuration database 82 of FIG. 1. After importing the control module 154, the configuration application may depict the control module 154 and/or the various blocks (e.g., function blocks, composite blocks, etc.) making up the control module 154 in the configuration screen 150. Thus, as illustrated in FIG. 4, the configuration system may enable the user to view the sub-blocks or subcomponents of the control module 154 as separate entities, blocks, icons, etc. In particular, the control module (named MOD1) of FIG. 4 includes a set of eight function blocks which are interconnected via communication links.

If desired, the user can then establish or create one or more alarm group elements 156 for the control module 154 by creating each of these alarm group elements 156 from a template (for example by dragging and dropping an alarm group element template into the configuration screen 150, by using a pull down menu, etc.). The configuration application may then enable the user to configure each of the alarm group elements 156 with a unique identifier (e.g., a tag or name), a description, and one or more alarm viewing and handling attributes to be applied to or used for the various alarms of the control module 154 to be assigned to the alarm group element 156 being configured. For example, the user may define a particular plant display reference, and/or a particular faceplate display reference, and/or one or more alarm handling parameters or parameter values for each alarm group element 156. The configuration application may then store these attributes (e.g., a plant display reference, a faceplate display reference and one or more alarm handling parameter values) within the alarm group element 156.

Next, the user may select various blocks, components, or parts of the control module 154, such as one of the function blocks of the module MOD1, and may drag that component (or group of components) into or over one of the depictions of the alarm group elements 156, such as the alarm group element AG1 of FIG. 4, and may then drop that component or group of components onto the icon or other indication of the alarm group element 156, to thereby configure each of the alarms within the selected component or set of components of the control module MOD1 as being associated with the specified alarm group element 156. The arrows of FIG. 4 indicate the selection of a component or group of components (indicated by dotted boxes) as being associated with the alarm group elements to which the arrows point. Of course, the configuration application may use these configuration actions to fill out the alarm lists 120 of the control module 154 as well as to fill out the alarm listings 130 of the alarm group elements 156. If desired, the user may drag an entire control module 154 over to an alarm group element to thereby associate all of the alarms of the control module 154 with that alarm group, or may select individual components (such as function blocks) of a control module 154 and thereby associate the alarms of only that individual component (such as a function block) with a particular alarm group element 156. Generally speaking, any alarm within the selected control module component will be associated with the alarm group element to which the component is dragged and dropped. If the block that is assigned (selected and dragged) is a composite block (made up of sub-blocks or sub-components) then, all of the blocks or sub-components within that composite block will automatically be part of or assigned to the selected alarm group element 156 (and thus to the alarm group for that alarm group element).

However, as will also be understood, in another embodiment in which alarm group elements 156 define separate alarm group modules within the plant that may contain alarms from multiple different containers, the configuration screen 150 of FIG. 4 may display multiple different modules (or other containers) and the different blocks or components of each of these modules (or other containers) may be assigned to different alarm group modules (such as alarm group modules for groups AG1, AG2, AG3, etc.) in the same manner as described above.

After being configured, the alarm group elements 156 may then be instantiated as parts of (e.g., sub-components of) the module 154 for which they were created or, in some cases, may be instantiated as separate alarm group modules. The module(s) in which the alarm group elements 156 is/are installed is/are then downloaded to a controller or other node (e.g., such as to a field device, an I/O device, or other container) in which an actual modules that reference the alarm groups will be executed. For example, if control module MOD1 references alarm groups AG1-AG3 when the control module MOD1 is downloaded to node 1, then the alarm group elements AG1-AG3 will also be downloaded to node 1 as part of MOD1 or as separate alarm group modules.

Figure 5:
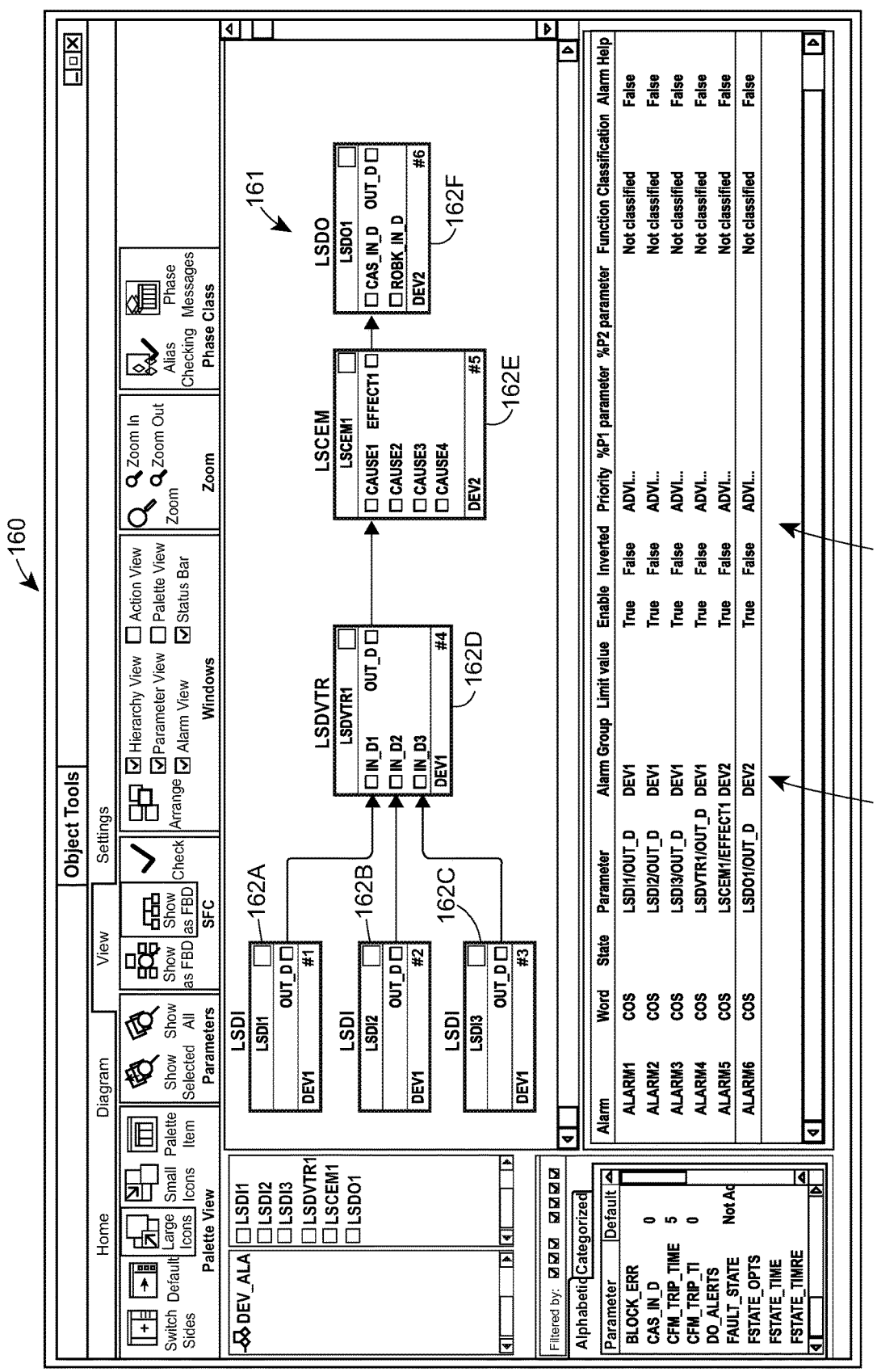
FIG. 5 depicts a user interface display screen illustrating a first plant display generally associated with a control module.

Of course, the alarm groups and alarm group elements described herein could be configured in other manners, such as for example, using other types of user interface actions, screens, or devices. For example, a user may be able to configure alarm groups for a control module using an interface screen that depicts information for the control module. As an example only, a user interface screen 160 of FIG. 5 illustrates information for a particular control module MOD1 having three input function blocks LSDI1 (162A), LSDI2 (162B), and LSDI3 (162C), connected to two intermediate function blocks LSDVTR1 (162D) and LSCEM1 (162CE), which is furthermore connected to an output function block LSDO1 (162F). Each of the function blocks 162 may be assigned as a block to one or more alarm groups named DEV1 and DEV2 in this case. In the example of FIG. 5, the function blocks LSDI1, LSDI2, LSDI3, and LSDVTR1 (and thus all of the alarms of these blocks) are assigned to alarm group DEV1, while the function blocks LSCEM1 and LSDO1 (and all of the alarms of these blocks) are assigned to the alarm group DEV2. To illustrate this fact, each function block 162 includes an alarm group parameter (displayed in the lower left of each function block 162) defining the alarm group to which the function block 162, and thus all of the alarms of the function block 162, belong. The user may be able to use the screen 160 to insert or change this alarm group parameter of each of the function blocks 162. Moreover, if any of the function blocks 162 is a composite block, all of the alarms of all of the sub-blocks within the composite block are assigned to the alarm group of the composite block.

The screen 160 also includes an alarm properties view section 164 showing the configuration of the alarms within the control module MOD1. In this case, the alarm properties view section 164 illustrates the alarms associated with the blocks 162 as including alarms ALARM1-ALARM6, and illustrates the values of a set of alarm parameters for each of the alarms ALARM1-ALARM6 in a set of columns in the alarm properties view section 164. In this case, the alarm properties view section 164 includes an alarm group column 165, that defines the alarm group associated with each particular alarm (i.e., illustrating the alarm group to which each alarm has been assigned), e.g., either alarm group DEV1 or alarm group DEV2. If an alarm or a block in which the alarm resides is not assigned to an alarm group for the module, then the column 165 will either be blank or will contain the module name (e.g., MOD1) or other container name of the container being depicted. Of course, the user could use this configuration screen 160 to specify the alarm groups for particular alarms of the module, such as by filling out the values of the column 165 for the particular alarms ALARM1-ALARM6, or by specifying the alarm group parameter value for each of the function blocks 162, to thereby specify the alarm group to which each of the particular alarms ALARM1-ALARM6 belongs. This configuration action then defines the specific alarm handling and viewing properties associated with each of the alarms of the module or other container, such as which plant display and faceplate display will be used when the alarm is selected in an alarm banner of a user interface display application 95 such as that of FIG. 2.

Of course, any other manners of configuring the alarm groups, alarm group elements (such as modules), and/or the control modules (or other containers) may be used to specify associations between alarms of control modules (or other containers) and alarm groups, for the purpose of defining alarm handling and viewing properties of alarms separate from the handling and viewing characteristics of the modules or containers which generate the alarms. Moreover, an alarm configuration system may enable a user, such as a configuration engineer, to assign alarms of control modules or other containers to alarm groups from context menus of alarm group configuration screens, or from context menus in configuration screens associated with the control modules or other containers, such as that depicted in FIG. 5.

While the description of FIGS. 4 and 5 is provided as describing the configuration of a control module to include various alarm groups and alarm group properties, the same actions could be taken to configure and use alarm groups for other types of containers as well, such as safety logic modules, plant devices (e.g., field devices, I/Odevices), etc.

Figure 6:
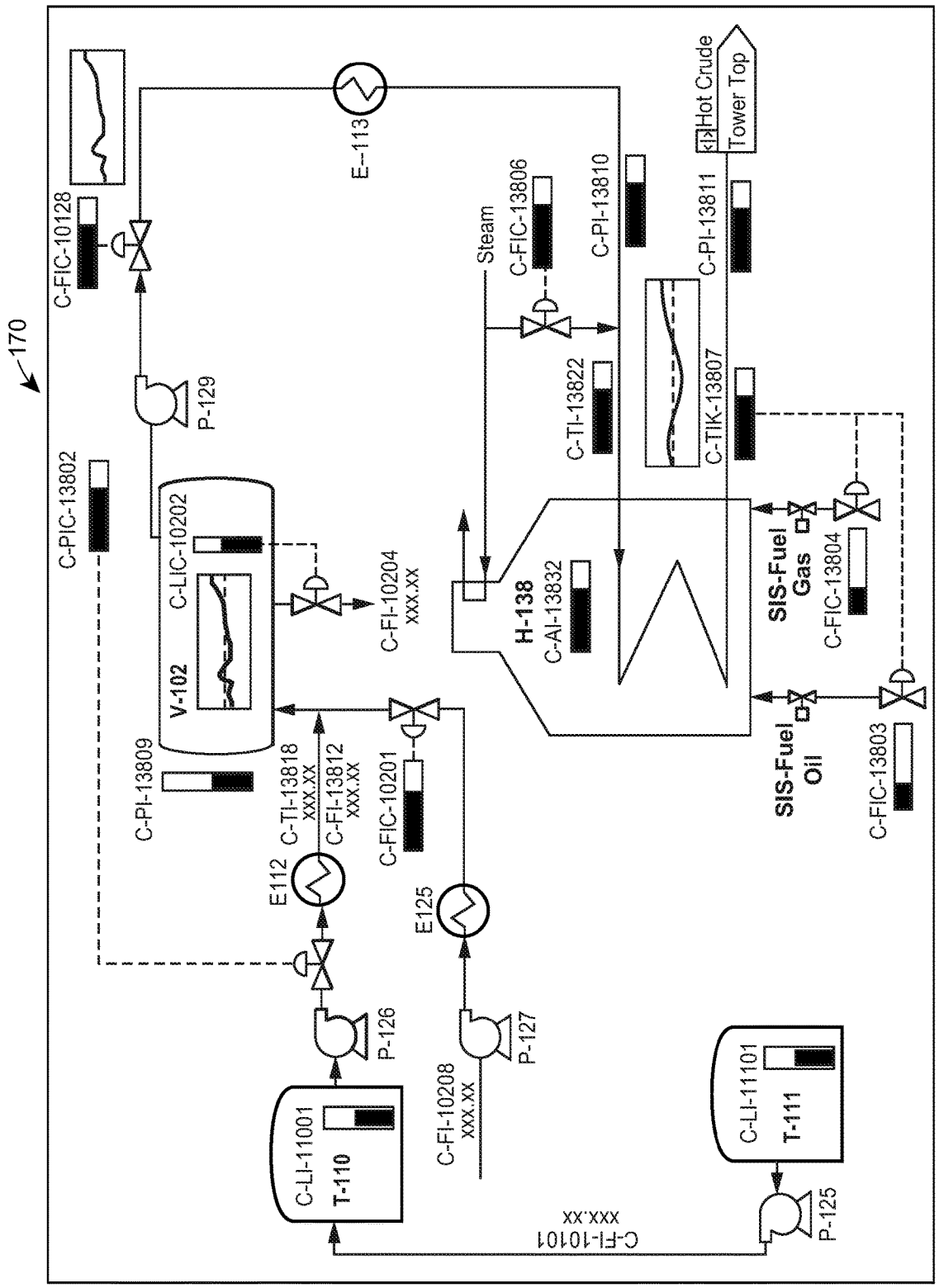
FIG. 6 depicts a user interface display screen illustrating a second plant display depicting a portion of the plant that is depicted in the first plant display of FIG. 5, but having additional information therein.
Figure 7:
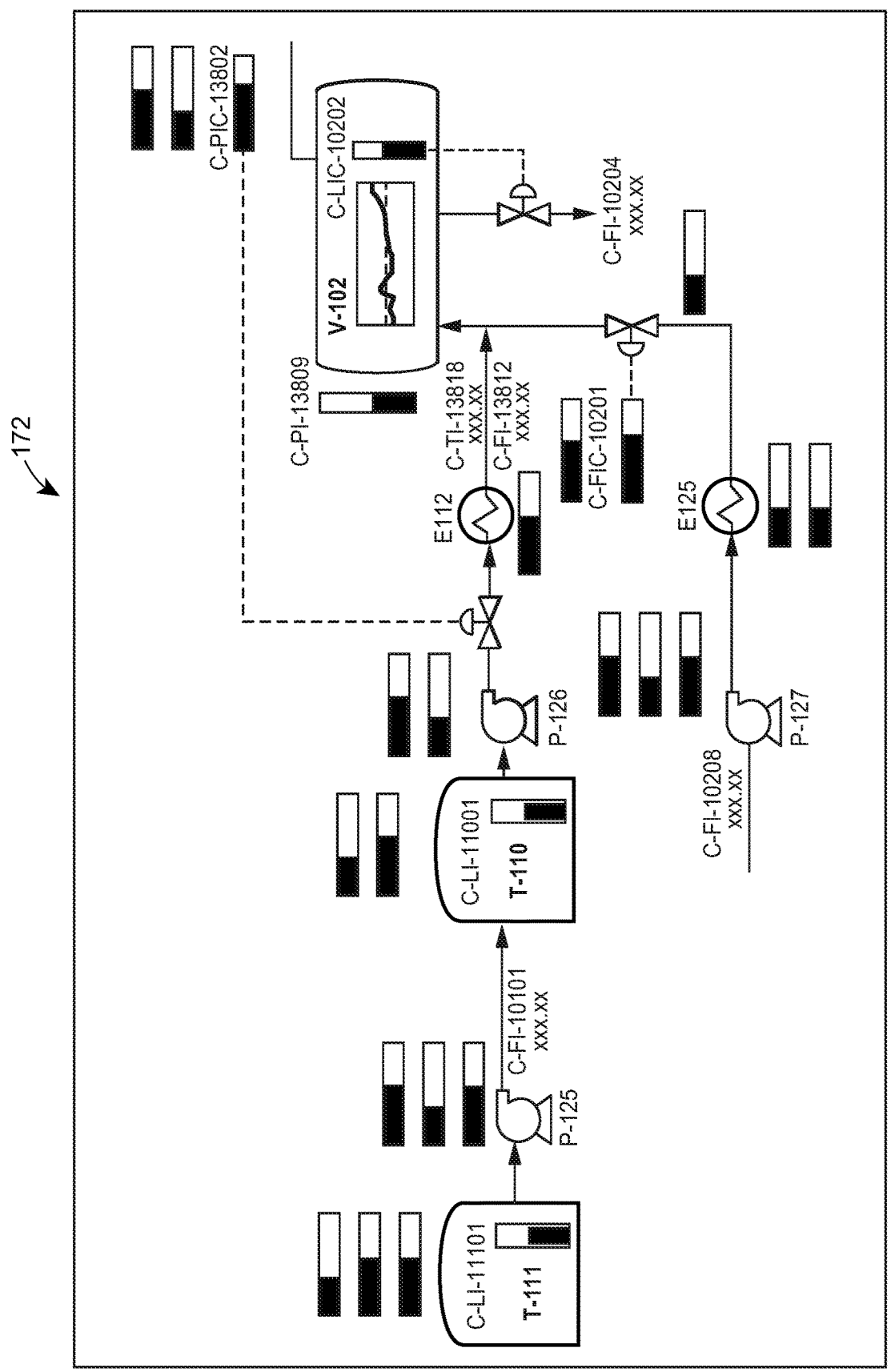
FIG. 7 depicts a user interface display screen illustrating a third plant display depicting another portion of the plant that is depicted in the first plant display of FIG. 5, but having additional information therein.
Figure 8:
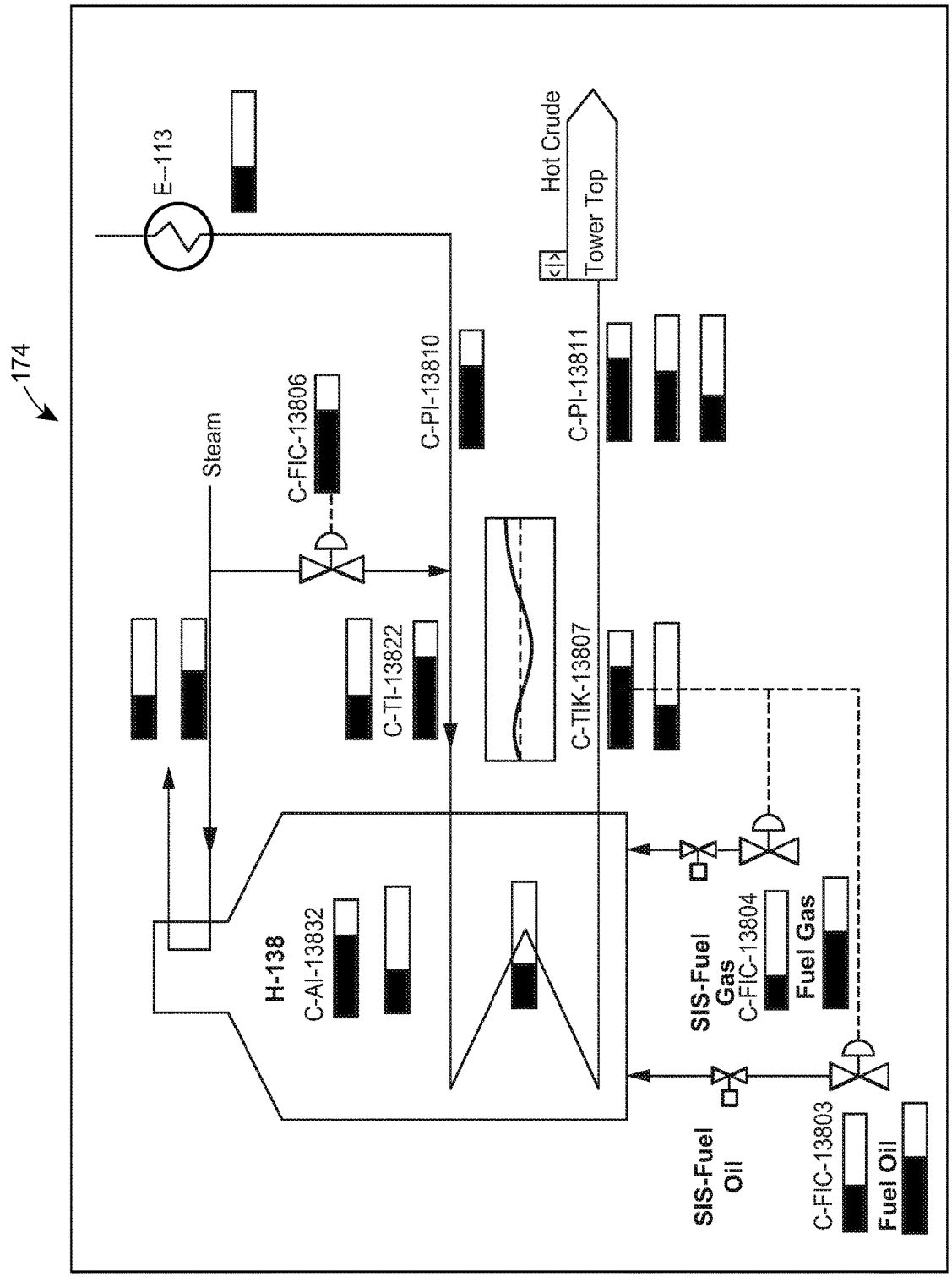
FIG. 8 depicts a user interface screen illustrating control module information, including alarm group information, for the alarms within various sub-blocks of a control module.

FIGS. 6-8 provide an example of the various plant displays that may be used by a container and different alarm groups of a single container to provide different information to a user who selects an alarm. In particular, the plant displays of FIGS. 6-8 may be used to implement the various alarm-handling functions associated with displaying alarm information to a user in response to the user selecting an alarm, such as selecting one of the alarms displayed in the alarm banner 99 of FIG. 2 and generated by the module MOD1 depicted in the screen 160 of FIG. 5. In particular, FIG. 6 illustrates a first plant display screen 170 that is associated with or used as a default plant display for the module MOD1 depicted in the display screen 160. The plant display screen 170 includes various tanks interconnected by pumps, fluid lines, valves, control system components such as sensors, etc., along with various information depicting various values of fluid flow, valve positions, sensor measurements, etc. Thus, in the traditional sense, any of the alarms that would have been generated by the module MOD1 of FIG. 5, upon being selected on an alarm display screen, such as that of FIG. 2, would cause the plant display 170 of FIG. 6 to be provided to and illustrated to the user.

However, the plant display 170 may not have enough information or may not have the most appropriate information for a user to understand the selected alarm or the conditions in the plant 5 that led to the alarm, or to be able to obtain information as to how to best deal with the alarm, because there may be other plant displays, such as those of FIG. 7 or 8, which have additional or better information about the same (or different) area, unit, device, control logic, etc., of the plant 5 that the user could use in better understanding and/or dealing with the selected alarm. For example, FIG. 7 illustrates a second plant display 172, which generally corresponds to the upper left-hand side of the plant display 170 of FIG. 6, but which includes more information about various parameters therein, such as pump flows, tank parameters other than tank levels, etc. Similarly, FIG. 8 displays a further plant display 174 that generally corresponds to the lower right-hand side of the plant display of FIG. 6, but which displays more information about the various components in this section of the plant, including, for example, additional information about fuel oil flow and fuel gas flow into the tank H-138, the control variable values associated with the valves used in this section of the plant 5, and other various values within that portion of the plant 5.

Importantly, some of the alarms of a control module (such as the control module MOD1) can be assigned to the alarm group (e.g., DEV1) that uses the plant display 172 of FIG. 7 and some of the alarms of the same control module (e.g., MOD1) can be assigned to the alarm group (e.g., DEV2) that uses or references the plant display 174 of FIG. 8. The user may be able to use or view the various plant and operational values (or other elements or information) as depicted in FIG. 7 or FIG. 8 to more appropriately understand or deal with an alarm that is generated by the control module (MOD1) that controls these portions of the plants, but would not have the same capability to do so simply viewing the plant display 170 of FIG. 6 which is the plant display generally specified for the control module MOD1 which generated the alarms. Thus, the plant display 172 and 174 of FIGS. 7 and 8 may be used or provided as the display screens associated with the selection of an alarm belonging to alarm group DEV1 or alarm group DEV2, respectively, when the alarm is generated by the control module MOD1, while the plant display screen 170 may be used as the plant display for the generalized control module MOD1 (e.g., which is used for viewing the operation of the plant related to control module MOD1 when not dealing with alarms).

Generally speaking, when any of the alarms of an alarm group (e.g., DEV1) of a control module (e.g., MOD1) or other container is initiated and presented in an alarm banner or other alarm display, and is then selected by a user, such as a control operator, the alarm handling system may operate to identify the alarm group or alarm group element to which the selected alarm belongs, and will then immediately obtain and display the appropriate plant display (and/or faceplate display) for that alarm group (as stored in the alarm group element or module for that alarm group) to enable the user to better understand the alarm or to determine actions to take in response to the alarm. The alarm handling system may also use the alarm handling parameters of the alarm as stored in the alarm group element to determine how the user may interact with the alarm, viewing characteristics of the alarm, suppression characteristics of the alarm, priority of the alarm, etc.

Of course, it is not necessary that the plant displays associated with a particular alarm group of a module or other container be overlapping with, or be subsets of a plant display associated with the module or other container itself. For example, the plant display for the alarm group DEV1 could correspond to an entirely different section of the plant 5 or to a device or a unit or some other section of the plant 5 that is not depicted in the plant display 170 of FIG. 6, which is the default plant display for the control module MOD1 that includes the alarm group DEV1. In other cases, the plant displays for one or more of the alarm groups for a module or other container could overlap portions of the plant display for the module or other container, but could also include information about different areas, devices, or parts of the plant 5. Thus, plant displays for alarm groups for the alarms of a module or other container could overlap or not overlap the plant display for the module or other container itself, could include all, some or none of the information of the plant display for the module or other container itself, could include more information in some respects than the plant display for the module or other container itself, could include less information in some respects than the plant display for the module or other container itself, or could differ in any other way from the plant display for the module or other container itself.

Figure 9:
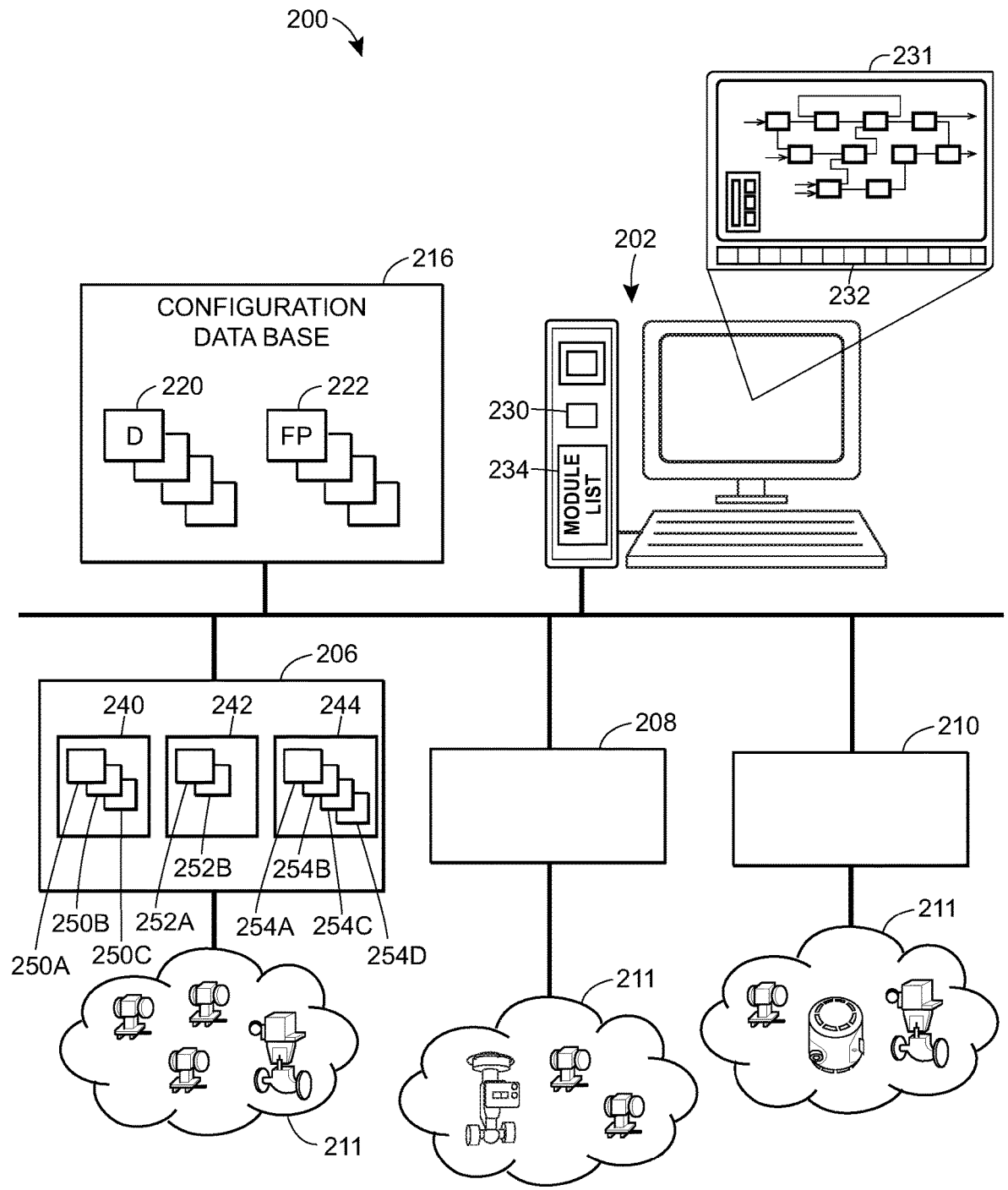
FIG. 9 depicts a plant communication diagram that illustrates a manner of implementing communications between nodes of the plant used by the alarm handling and viewing

One manner of implanting communications within a plant network to effect the alarm display handling and viewing properties of an alarm group instead of using the display and viewing properties of the module (or other container) that generated the alarm may use aliasing to cause the alarm handling system to access the alarm properties of an alarm group element for a container rather than the display properties of the container itself. FIG. 9 depicts a plant communication system diagram that may be used to perform alarm related communications using an alarm aliasing methodology to separate the displays and other alarm handling features for an alarm from the displays and handling features of the module or other container in which the alarm is generated.

In particular, FIG. 9 illustrates a plant network 200 having an alarm display or user interface device 202 connected via a communication connection 204 (such as an Ethernet connection or bus which may be, for example, the bus 10 of FIG. 1) to various nodes 206, 208, 210, etc., of the plant 200. The nodes 206, 208, 210 may be, for example, the controllers 11 and/or the safety logic solvers 72, etc., of FIG. 1, or may be or include the I/Onetworks and field devices of FIG. 1 (shown schematically in the clouds 211 in FIG. 9). The nodes 206-210 of FIG. 9 may also or instead be one of the workstations 80, databases 82, 84, or other computing devices illustrated in FIG. 1 as being connected to the plant communication network 10 of FIG. 1. Likewise, a configuration database 216 is illustrated as being connected to the communication bus 204, with the configuration database 216 storing various plant displays 220 and faceplate displays 222 that will be used by the user display interface 202 to provide plant displays and/or faceplate displays to a user in connection with viewing an alarm in response to selecting an alarm in an the alarm banner or other alarm application.

As illustrated in FIG. 9, the user interface device 202 includes a user interface display application 230 which may depict a portion of the plant 200 on a display screen 231 using any of the plant displays 220 stored in the configuration database 216, to enable an operator, a control engineer, a safety engineer, or other user to view the operations of different portions of the plant 200. In addition, the user interface display application 230 may include an alarm banner 232, which depicts indications (e.g., icons) of various alarms that have been generated or initiated (e.g., set active) within the plant 200 within one or more nodes of the plant, such as any of the nodes 206, 208, 210. When, for example, a user is using the user interface device 202 and is viewing the displays 230 and 232, and an alarm of interest appears (as an alarm icon in the alarm banner 232 for example), the user may select the alarm icon within the alarm banner 232 in order to obtain more information about the alarm or about the plant 200 as it relates to the selected alarm. The user interface display application 230 may then operate to obtain information from the selected alarm as to the module and/or alarm group for a module that is associated with the alarm (e.g., that generated the selected alarm).

As part of this process, when a module or other container that uses alarm groups generates an alarm and sends an alarm initiation message to the node or device 202 in which the user interface display application 230 resides, the alarm indication may indicate the alarm group to which the alarm pertains, for example, by the alarm group tag or other identifier. This indication may be a unique tag or name in the system that specifies a particular alarm group within or associated with a particular module or other container. In some cases, the alarm group name may be aliased to the module or other container in which the alarm group resides or to which the alarm group pertains. Thus, for example, an alarm group for a control module may include, as part of the name or tag for the alarm group, both the module name or tag and a separate alarm group indication. For example, an alarm group tag for alarm group AG1 of control module MOD1 may have a tag MOD1/AG1, or some variation thereof.

Moreover, as is typical, each node or device in the plant 200 may store a module list 234 including a list of modules, devices, and other components of the plant 200 and the communication paths or details needed to communicate with each of the modules, devices, or other components of the plant 200. The lists 234 (shown as being stored in the device 202 of FIG. 9) may be expanded in this case to include the alarm group tag names and communication paths for the alarm group elements defined in the system for any of the modules or other containers (either as sub-components of the modules or other containers, or as separate modules). Thus, the list 234 may include or store a separate communication path for a module (which may generate one or more alarms) and for each alarm group or alarm group element within or associated with the module. The communication paths or names of the alarm groups within or for the modules may be aliased to the module name. In some cases, the aliasing may be performed by adding or concatenating an alarm group name to a module or other container name to create the separate communication path for the module for each of the alarm groups within or associated with the module.

Thus, when an alarm is generated and displayed at the user interface device 202 (e.g., as an icon on the alarm banner 232), the alarm will generally identify the alarm group name to which the alarm belongs. If the alarm does not belong to any alarm group, then the alarm will include the name or other identifier of the module or other container which generated the alarm. When the alarm in the alarm banner 232 is selected for viewing (by a user, operator, etc.), the user interface display application 230 accesses the alarm information sent with the alarm to determine the name of the alarm group and/or name of the module to which the alarm belongs. If the selected alarm has been assigned to an alarm group (e.g., of a module), the alarm may include the alarm group name or tag (which may be a unique name within the process control system). The user interface display application 230 then accesses the module list 234 in the node 202 of the user interface display application 230, finds the alarm group name in the list 234, and determines the communication path to the alarm group element and/or module in which the alarm group element for the alarm group is stored. In the case in which the selected alarm belongs to an alarm group defined as a sub-element of a module or other container, the communication path of the alarm group may be an aliased name or path to the specific alarm group element properties for the module in which the alarm group element resides. If the alarm group element is a separate module in a node, the communication path may specify the alarm group module as the communication destination. If the selected alarm is not assigned to an alarm group, the alarm will specify the module to which the alarm belongs and the user interface display application 230 will locate and use the communication path to that module.

In the example system of FIG. 9, the node 206 is depicted as including three modules 240, 242, and 244, wherein each of the modules 240, 242, 244 have various different alarm groups associated therein, depicted as alarm group elements 250A-250C, (in the module 240), 252A and 252 B (in the module 242), and 254A, 254B, 254C, 254D (in the module 244). When the user interface display application 230 sends a message to the module containing the alarm group element and its associated information (e.g., a plant display, a faceplate display, and one or more alarm handling parameters), the user interface display application 230 may request any of the various information available about the alarm group such as the plant display, the faceplate display, and/or any of the alarm handling parameter values for the alarm group. The module having the alarm group element therein returns the requested information, such as the plant display reference, the faceplate display reference, and any alarm handling parameters for the alarm group element to the application 230, which then uses this information in providing information to the user. In the case of a plant display, the application 230 may access or request the referenced plant display from the configuration database 216 in which this display is stored and the application 230 may display that plant display on the user interface device 202. Likewise, in the case of a faceplate display, the application 230 may access or request the referenced faceplate display from the configuration database 216 in which this display is stored and the application 230 may display that faceplate display on the user interface device 202. Still further, the application 230 may use any of the alarm handling parameters obtained from the alarm group element to direct interaction with the user regarding the alarm, such as priority features of the alarm, display features of the alarm (e.g., colors, types, fonts, video parameters, etc.), navigation features for the alarm, suppression features to be applied to the alarm, etc.

In one case, the application 230, when communicating with a module (such as the module 240 in the node 206) having one or more alarm group elements therein, may set up a module client proxy in the node 202 which requests information from the node 206 (in which the alarm group element for the selected alarm is stored) pertaining to the module parameters of the module of interest. Thereafter, the node 206 establishes or creates a module server proxy which then requests the information from the particular module 240 associated with the client request (based on the communication path for the module 240), and provides that information back to the module client proxy, which then delivers that information to the application 230 that requested the information. If, for example, the primary plant display of the module 240 was being requested, the module client proxy would be set up in the node 202 which would then communicate with the node 206 wherein the module server proxy would be set up to communicate with the module 240. The module server proxy would then request the primary plant display reference from the module 240 as one of the module parameters, and would then return that information to the module client proxy in the device 202. The device 202 may then access or obtain the reference plant display from the configuration database 216, for example. In some cases, the referenced plant display may already be stored in the node 202, in which case it would not be necessary to access this plant display from the configuration database 216 or other storage device where this plant display is stored.

Now, when the plant display application 202 needs to obtain information for handling and viewing an alarm that is assigned to an alarm group, such as in response to an alarm selection in an alarm banner, the application 230 needs to obtain the alarm handling and viewing information for the selected alarm from the alarm group element for the module to which the alarm is assigned. To accomplish this communication, the system may use aliasing to assure that the communication takes place with the appropriate alarm group element of the appropriate module.

In one embodiment, as described above, the alarm could include an identification of the alarm group or alarm group element to which the alarm belongs and the application 230 can use this identification and the module list 234 (expanded to include communication paths for alarm group elements of or within modules or other containers) to determine the communication path for that alarm group element and thus the properties of the alarm group element for use in viewing and handling the selected alarm. Thus, in the case in which the selected alarm specifies the alarm group element 250B of the module 240 of node 206 of FIG. 9, the application 230 would communicate directly with that alarm group element 250B (as a sub-component of the module 240) to obtain the plant display, faceplate display, and/or alarm handling and viewing parameter values stored in or as part of the alarm group element 250B.

In another embodiment, in which a selected alarm only specifies the module or other container to which the alarm belongs, the node 202 may store a container shadow block for each module in other nodes of the plant 200, such as in the node 206, and each module shadow block may store the alarm group list for each such module, specifying the alarm groups to which each alarm of the module is assigned. The shadow block for the module 240 would thus store a list of the alarms therein and the alarm groups or alarm group elements to which each of those alarms is assigned. In this case, when the user interface device 202 receives an input requesting information about a particular alarm (e.g., via the alarm banner 232) and, in particular, the alarm handling information regarding which plant display or faceplate display to use or to present to a user, the application 230 will access the module shadow object associated with the module that generated the alarm and determine the alarm group of that module to which that particular alarm is assigned.

Thereafter, the application 230 may set up an alias module client proxy in the node 202 which will communicate with the node 206 in which the alarm originating module 240 is stored, along with its associated alarm group elements. The node in which the alarm originating module 240 is located (e.g., the node 206) will then set up an alias module server proxy, which will then communicate with the module that contains the alarm group element for the alarm using an alias for the module so that the module returns the alarm group element information for a particular alarm group of the module instead of the general information for the module itself.

To set up this alias based communication, the runtime system associated with the user interface 202 may store a set of code that, when information is being requested from a module, may recognize whether the requested information is actually intended to come from the module itself or from an alarm group element for or within the module. If so, the code sets up the alias module client and server proxies as described above.

It should be noted that, in this regard, the alias-based alarm handling and viewing functionality described above allows each alarm (or a set of one or more alarms) of a particular module to be handled in a unique manner (e.g., with a separate plant display, faceplate display, and other alarm handling and viewing parameters) as compared to other alarms of the module or to the module itself. Of course, other manners of handling alarm groups within modules or other containers could be used instead.

Moreover, other methodologies can be used for enabling a user to set up, configure, and use alarm groups that enable different alarms of the same module to be viewed and handled differently, for example, to store and provide different information such as plant displays and faceplate displays for each of the different alarm groups. Moreover, other methodologies can be used to allow a single module to reference different plant and faceplate displays for alarm handling than the plant and faceplate displays to be used for other purposes, such as when viewing information of a module not associated with the generation of alarms. Thus, in effect, the system described herein enables the handling of the module and the handling of alarms within the module to be implemented separately and distinctly.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions, or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed:

1. A method of managing alarms in a process control system, comprising:
    enabling a user to create, using one or more computing devices, a container that includes one or more alarm conditions;
    enabling a user to configure, using one or more computing devices, a set of alarm groups, each of the set of alarm groups including one or more alarm handling and viewing properties, wherein the one or more alarm handling and viewing properties are not tied to the container;
    enabling a user to assign the one or more alarm conditions of the container to different ones of the set of alarm groups;
    presenting an alarm display interface on a user interface device for presenting an indication of one of the alarm conditions of the container when the one of the alarm conditions of the container is initiated by the container;
    enabling a user to select an indication of the one of the alarm conditions of the container via the alarm display interface;
    assessing, via one or more computing devices, one or more of the alarm handling and viewing properties of the alarm group to which the selected one of the alarm conditions is assigned; and
    using the one or more alarm handling and viewing properties of the alarm group to which the one of the alarm conditions is assigned to display information to a user via a user interface device.

2. The method of managing alarms of claim 1, wherein enabling a user to configure the set of alarm groups includes enabling the user to specify the one or more alarm handling and viewing properties of each of the alarm groups.

3. The method of managing alarms of claim 2, wherein enabling a user to specify the one or more alarm handling and viewing properties of each of the alarm groups includes enabling a user to specify a plant display for each of the alarm groups, and wherein using the alarm handling and viewing properties of the alarm group to which the one of the alarm conditions is assigned to display information to a user via the user interface device includes presenting the plant display of the alarm group to the user via the user interface device.

4. The method of managing alarms of claim 2, wherein enabling the user to specify the one or more alarm handling and viewing properties of each of the alarm groups includes enabling the user to specify a faceplate display for each of the alarm groups, and wherein using the alarm handling and viewing properties of the alarm group to which the one of the alarm conditions is assigned to display information to a user via the user interface device includes presenting the faceplate display of the alarm group to the user via the user interface device.

5. The method of managing alarms of claim 2, wherein enabling the user to specify the one or more alarm handling and viewing properties of each of the alarm groups includes enabling a user to specify one or more display properties for each of the alarm groups, and wherein using the alarm handling and viewing properties of the alarm group to which the one of the alarm conditions is assigned to display information to a user via the user interface device includes using the one or more display properties of the alarm group to control the operation of the user interface device.

6. The method of managing alarms of claim 1, further including creating a container for each of the set of alarm groups, and wherein assessing, via one or more computing devices, the alarm properties of the alarm group to which the selected one of the alarm conditions is assigned includes accessing the container for the alarm group associated with the selected one of the alarm conditions.

7. The method of managing alarms of claim 1, wherein accessing one or more of the alarm handling and viewing properties of the alarm group to which the selected one of the alarm conditions is assigned includes sending an alarm message addressed to the container aliased with information regarding the alarm group to which the selected one of the alarm conditions is assigned.

8. The method of managing alarms of claim 1, wherein enabling a user to create a container that includes one or more alarm conditions includes enabling the user to create a container in the form of a process control module having process control logic.

9. The method of managing alarms of claim 1, wherein enabling a user to create a container that includes one or more alarm conditions includes enabling the user to create a container in the form of a safety system logic module having safety instrumentation logic.

10. The method of managing alarms of claim 1, wherein enabling a user to create a container that includes one or more alarm conditions includes enabling the user to configure a field device having alarm conditions.

11. The method of managing alarms of claim 1, wherein enabling a user to assign the one or more alarm conditions of the container to different ones of the alarm groups includes presenting indications of one or more blocks of the container to a user via one or more computing devices and enabling the user to select one of the set of alarm groups to which one of the blocks of the container is to be assigned, and assigning the alarm conditions of the one of the blocks of the container to the selected one of the set of alarm groups.

12. The method of managing alarms of claim 11, wherein enabling the user to select one of the set of alarm groups to which the one of the blocks of the container is to be assigned includes, via a user interface device, allowing a user to select an icon of the one of the blocks of the container, allowing the user to drag the icon of the one of the blocks of the container over an icon of the selected one of the set of alarm groups, and allowing the user to drop the icon of the one of the blocks of the container onto the icon of the selected one of the set of alarm groups.

13. The method of managing alarms of claim 1, wherein enabling a user to configure a set of alarm groups includes configuring each of the set of alarm groups as sub-components of the container that includes the one or more alarm conditions.

14. An alarm handling and viewing system for use in process plant, comprising:
one or more containers disposed within the process plant, each of the one or more containers including;
one or more alarm conditions; and
one or more alarm group elements, each of the alarm group elements including a set of alarm group handling and viewing parameters, wherein the set of alarm group handling and viewing parameters are not tied to the one or more containers; and
a user interface application executed on one or more computer processors to present to a user via a user interface device information regarding the process plant, including an indication of an initiation of an alarm condition within one of the one or more containers, wherein the user interface application, in response to a selection of an initiated one of the alarm condition within one of the one or more containers;
determines the alarm group element to which the selected alarm condition pertains,
accesses one of the alarm group handling and viewing parameters of the alarm group element to which the selected alarm condition pertains; and
uses the accessed one of the alarm group handling and viewing parameters of the alarm group element to which the selected alarm condition pertains to display information to the user via a user interface device.

15. The alarm handling and viewing system of claim 14, wherein the one or more alarm group handling and viewing parameters of each of the alarm group elements includes a reference to a plant display, wherein the plant display reference identifies a plant display to be presented to the user by the user interface application.

16. The alarm handling and viewing system of claim 14, wherein the one or more alarm group handling and viewing parameters of each of the alarm group elements includes a reference to a faceplate display, wherein the faceplate display reference identifies a faceplate display to be presented to the user by the user interface application.

17. The alarm handling and viewing system of claim 14, wherein the one or more alarm group handling and viewing parameters of each of the alarm group elements includes one or more display parameters for the alarm group element, wherein the one or more display parameters are used by the user interface application to control the interaction of the user interface device with a user with respect to displaying information about an alarm within the alarm group element.

18. The alarm handling and viewing system of claim 14, wherein each of the one or more alarm group elements is stored as a sub-component of the container to which the alarm group element is associated.

19. The alarm handling and viewing system of claim 14, wherein each of the one or more alarm group elements is stored as a separate component from the container to which the alarm group element is associated.

20. The alarm handling and viewing system of claim 14, wherein the user interface application accesses one of the alarm group handling and viewing parameters of the alarm group element to which the selected alarm condition pertains by accessing the container for the alarm group element to which the selected alarm condition pertains.

21. The alarm handling and viewing system of claim 20, wherein the user interface application accesses the container for the alarm group element to which the selected alarm condition pertains using a message addressed to the container that includes the alarm condition aliased with information regarding the alarm group element to which the selected alarm condition is assigned.

22. The alarm handling and viewing system of claim 14, further including a list indicating a communication path for one or more of the alarm group elements of the container, and wherein the user interface application accesses one of the alarm group handling and viewing parameters of the alarm group element to which the selected alarm condition pertains by determining a communication path for the alarm group element from the list.

23. The alarm handling and viewing system of claim 14, wherein the container comprises a process control module having process control logic.

24. The alarm handling and viewing system of claim 14, wherein the container comprises a safety system logic module having safety instrumentation logic.

25. The alarm handling and viewing system of claim 14, wherein the container comprises a field device.

26. The alarm handling and viewing system of claim 14, further including an alarm condition configuration application that executes on a processor to enable a user to assign one or more alarm conditions of the container to ones of the alarm group elements.

27. The alarm handling and viewing system of claim 26, wherein the configuration application executes on the processor to present indications of one or more blocks of the container to a user and enables the user to select one of the set of alarm group elements to which one of the blocks of the container is to be assigned, and assigns the alarm conditions of the one of the blocks of the container to the selected one of the alarm group elements.

28. The alarm handling and viewing system of claim 27, wherein the configuration application executes on the processor to enable the user to select one of the alarm group elements to which the one of the blocks of the container is to be assigned by allowing a user to select an icon of the one of the blocks of the container, allowing the user to drag the icon of the one of the blocks of the container over an icon of the selected one of the alarm group elements, and allowing the user to drop the icon of the one of the blocks of the container onto the icon of the selected one of the alarms group elements.

29. A process control system for use in controlling a process plant having a process controller device coupled to a set of field devices, comprising:
 a plurality of containers disposed within one or more devices within the process plant, at least one of the plurality of containers including;
  a first set of handling and viewing parameters for the container, wherein the first set of handling and viewing parameters for the container is not tied to the container;
 a plurality of alarm conditions; and
 a multiplicity of alarm group elements, each of the alarm group elements including a set of alarm handling and viewing parameters that is different than the first set of handling and viewing parameters for the container;
 wherein the set of alarm handling and viewing parameters that is different from the first set of handling and viewing parameters for the container is not tied to the container; and
 wherein a different one of the plurality of alarm conditions is assigned to each of the multiplicity of alarm group elements.

30. The process control system of claim 29, further including a user interface application executed on one or more computer processors within the process plant to present to a user via a user interface device information regarding the process plant, including an indication of an initiation of an alarm condition within one of the plurality of containers, wherein the user interface application, in response to a selection of an initiated one of the alarm conditions within the one of the plurality of containers determines the alarm group element to which the selected alarm condition pertains, accesses one of the alarm group handling and viewing parameters of the alarm group element to which the selected alarm condition pertains and uses the accessed one of the alarm group handling and viewing parameters of the alarm group element to which the selected alarm condition pertains to display information to the user via a user interface device.

31. The process control system of claim 29, wherein the one or more alarm handling and viewing parameters of each of the alarm group elements includes a reference to a plant display.

32. The process control system of claim 29, wherein the one or more alarm group handling and viewing parameters of each of the alarm group elements includes a reference to a faceplate display.

33. The process control system of claim 29, wherein the one or more alarm handling and viewing parameters of each of the alarm group elements includes one or more display parameters for the alarm group element, wherein the one or more display parameters may be used by a user interface application to control the interaction of a user interface device with a user with respect to displaying information about an alarm condition assigned to the alarm group element.

34. The process control system of claim 29, wherein the at least one of the plurality of containers includes a first tag by which the container is communicatively accessible, and wherein each of the alarm group elements includes a different tag by which the alarm group element is communicatively accessible, so that the alarm handling and viewing parameters of each alarm group element are accessible using a different tag than the first tag for the container.

35. The process control system of claim 29, wherein the at least one of the plurality of containers comprises a process control module having process control logic.

36. The process control system of claim 29, wherein the at least one of the plurality of containers comprises a safety system logic module having safety instrumentation logic.

37. The process control system of claim 29, wherein the at least one of the plurality of containers comprises a field device.

* * * * *